US007486911B2

(12) United States Patent
Harada

(10) Patent No.: US 7,486,911 B2

(45) Date of Patent: Feb. 3, 2009

(54) ELASTIC MEMBER, PROCESS FOR MANUFACTURING THEREOF AND MASS PRODUCTION PROCESS THEREOF, PROCESS CARTRIDGE, AND ELECTROPHOTOGRAPHIC APPARATUS

(75) Inventor: Masaaki Harada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 10/704,677

(22) Filed: Nov. 12, 2003

(65) Prior Publication Data

US 2004/0142179 A1 Jul. 22, 2004

(30) Foreign Application Priority Data

Jan. 17, 2003 (JP) ............................ 2003-009756

(51) Int. Cl.

| | |
|---|---|
| ***G03G 21/18*** | (2006.01) |
| ***G03G 15/00*** | (2006.01) |
| ***B29C 63/18*** | (2006.01) |
| ***B32B 15/06*** | (2006.01) |
| ***B32B 1/00*** | (2006.01) |

(52) U.S. Cl. ................ 399/115; 264/171.1; 264/209.1; 428/413; 428/418

(58) Field of Classification Search ................ 399/107, 399/108–126; 264/171.1, 173.16, 209.1; 428/413, 418; 523/453, 461

See application file for complete search history.

(56) References Cited

U.S. PATENT DOCUMENTS

| | | | | |
|---|---|---|---|---|
| 3,706,819 | A * | 12/1972 | Usamoto et al. | 525/211 |
| 5,733,235 | A * | 3/1998 | Waku et al. | 492/25 |
| 6,078,778 | A * | 6/2000 | Murata et al. | 399/313 |
| 6,372,857 | B1 * | 4/2002 | Obrecht et al. | 525/332.6 |
| 6,458,883 | B1 | 10/2002 | Takashima et al. | 524/495 |
| 6,753,374 | B1 * | 6/2004 | Hannon et al. | 524/492 |
| 2003/0096917 | A1 * | 5/2003 | Hattori et al. | 525/403 |

FOREIGN PATENT DOCUMENTS

| | | | |
|---|---|---|---|
| JP | 05-086235 | * | 4/1993 |
| JP | 06-279621 | * | 10/1994 |
| JP | 08-157665 | * | 6/1996 |
| JP | 09-297454 | | 11/1997 |
| JP | 2000-265008 | | 9/2000 |

OTHER PUBLICATIONS

Machine Translation of JP 05-086235, provided by the JPO website.*
Machine Translation of JP 08-157665, provided by the JPO website.*
Machine Translation of JP 06-279621, provided by the JPO website.*
Patent Abstracts of Japan for JP Publication No. 05-086235, published Apr. 6, 1993.
Patent Abstracts of Japan for JP Publication No. 08-157665, published Jun. 18, 1996.
Patent Abstracts of Japan for JP Publication No. 06-279621, published Oct. 4, 1994.

* cited by examiner

*Primary Examiner*—Michael J Feely
(74) *Attorney, Agent, or Firm*—Fitzpatrick, Cella, Harper & Scinto

(57) ABSTRACT

In an elastic member for electrophotography, having a conductive or semiconductive elastic layer, the elastic layer contains a vulcanized rubber obtained by vulcanizing a material rubber in the presence of a specific sulfur-atom-containing compound as a vulcanization accelerator that can not easily cause any scorching at the time of high-temperature kneading and extrusion, and yet has relatively high vulcanization rate and also can provide vulcanized rubbers with superior quality.

23 Claims, 5 Drawing Sheets

ELASTIC MEMBER, PROCESS FOR MANUFACTURING THEREOF AND MASS PRODUCTION PROCESS THEREOF, PROCESS CARTRIDGE, AND ELECTROPHOTOGRAPHIC APPARATUS

BACKGROUND OF THE INVENTION

1. Field of the Invention

This invention relates to a conductive elastic member for electrophotography, and more particularly to a roller-shaped conductive elastic member, and also to a process for manufacturing thereof, a mass production process therefor, a process cartridge, and an electrophotographic apparatus.

2. Related Art

In the following, the present invention is described in detail taking the case of the charging member, in particular, a roller-shaped charging member, such as charging roller, as one example, but the electrophotographic conductive or semiconductive elastic member of the present invention may be any member as long as it is a member used in electrophotography and required to have conductivity or semiconductivity, and elasticity. It may include, besides the charging member, e.g., a developing member, a transfer member, a charge elimination member, and a transport member such as a paper feed roller.

In electrophotographic apparatus, a contact charging system is employed as one of ways for charging the surfaces of electrophotographic photosensitive members electrostatically. The contact charging system is a system where a charging member to which a voltage is kept applied is brought into proximity to or contact with the surface of an electrophotographic photosensitive member to charge the surface of the electrophotographic photosensitive member electrostatically. As a charging member therefor, commonly used is a roller-shaped charging member (charging roller) constituted of a mandrel made of a metal and a conductive (semiconductive) elastic layer covering around the mandrel.

The elastic layer of the charging roller is required to have an appropriate conductivity in order to prevent a leak from being caused by pinholes, scratches or the like of the electrophotographic photosensitive member surface. In order for the electrophotographic photosensitive member to be uniformly charged, it is also important for the elastic layer to be conductive (semiconductive) to have an electrical resistance value of from $1\times10^3$ to $1\times10^{10}$ Ω·cm as volume resistivity.

In order for the elastic layer to hold an appropriate conductivity, conductive particles are dispersed in a rubber which is a material constituting the elastic layer, or a conductive rubber is used in which the rubber itself has conductivity.

Now, the elastic layer of the charging roller is produced using a rubber composition containing such a rubber with conductive particles dispersed therein, or the conductive rubber, and a vulcanizing agent and optionally containing a vulcanization accelerator and so forth, and by extruding the rubber composition into a roller, e.g., in such a way that it covers the peripheral surface of a mandrel, and thereafter vulcanizing the rubber. However, air bubbles (hereinafter "voids") may be produced in the elastic layer as a result of the evaporation of water incorporated in the rubber or rubber composition, caused by the heat at the time of vulcanization. Then, when the surface of the elastic layer of this charging roller is polished, such voids may come exposed to the elastic layer surface to make the elastic layer have concavities on its surface.

Where such a charging roller is set in an electrophotographic apparatus and images are reproduced to make evaluation, the part having such defects may cause faulty charging to cause faulty images. Such faulty images caused by voids may occur Without regard to whether or not the elastic layer surface has been subjected to modification treatment such as irradiation with ultraviolet light, irradiation with electron rays or impregnation with a surface treatment solution. Also, especially where a surface coat layer is formed on the elastic layer by coating, even if the voids standing exposed to the elastic layer surface are microscopic, their presence on the elastic layer surface may cause large crater-like defects on the surface coat layer which have grown from the voids as nuclei. Then, such voids may remarkably occur especially when using an ion-conductive rubber having a polar group in the molecule. This is considered due to the fact that the polar group tends to adsorb water molecules.

To solve such problems, a method is proposed in which a rubber is compounded with a dehydrating agent which removes water content of unvulcanized rubbers, as exemplified by calcium oxide (see, e.g., Japanese Patent Application Laid-Open No. H9-297454). However, the dehydrating agent has a poor dispersibility in rubbers, and also the compounding of rubber with the dehydrating agent may make the elastic layer have a high hardness.

Accordingly, the present inventor has devised that, when a rubber composition having not been vulcanized is extruded by means of a vented extruder, the extrusion temperature is set high so as to remove water content and other volatile components in the unvulcanized rubber. In such a case, however, depending on the type of a vulcanization accelerator in the rubber composition, vulcanization may unintentionally begin to take place at the time of extrusion to make the unvulcanized rubber begin to cure (hereinafter "scorch" or "scorching"), making it difficult to carry out extrusion.

Meanwhile, as long as the elastic layer extruded into a roller has sufficiently small surface roughness, the elastic layer need not to be polished, and because of that, there is less possibility that concavities are formed on the elastic layer because of the voids even if any voids are present in the elastic layer. However, in order to form such an elastic layer having small surface roughness, it is necessary, e.g., to extrude an unvulcanized rubber composition at a high temperature, where it has been unavoidable to cause scorching at the time of extrusion and various difficulties coming incidentally thereto.

Taking account of productivity of charging members, it is indispensable to use a vulcanization accelerator in order to shorten the time necessary for vulcanization. The present inventor has perceived that, in order to efficiently manufacture high-grade conductive elastic members used for electrophotography, it is necessary to find out a vulcanization accelerator that can satisfy at a high level the incompatible properties that it can not easily cause the scorching at the time of extrusion and has high vulcanization rate.

As vulcanization accelerators used to vulcanize conductive rubber materials used in electrophotographic apparatus, various examples are enumerated in, e.g., Japanese Patent Application Laid-Open No. 2000-265008. According to studies made by the present inventor, however, it has been unable to find out vulcanization accelerators that can not easily cause any scorching at the time of high-temperature extrusion and have relatively high vulcanization rate, and also can provide vulcanized rubbers with superior quality. It has also been found that a sulfenamide type vulcanization accelerator, which is commercially available as a vulcanization accelerator having relatively high vulcanization rate, makes rubbers vulcanized therewith worse in its permanent set and found difficult to obtain high-grade elastic layers.

SUMMARY OF THE INVENTION

Accordingly, the present inventor has made further studies, and finally discovered vulcanization accelerators that can not easily cause any scorching at the time of high-temperature kneading and extrusion intended for removing water content in the rubber or rubber composition, and yet can fulfill at a high level the conditions that it has relatively high vulcanization rate and also can provide vulcanized rubbers with superior quality.

An object of, the present invention is to provide an elastic member having a conductive or semiconductive elastic layer with high grade and also superior productivity.

Another object of the present invention is to provide a process for manufacturing at a low cost an elastic member having a conductive or semiconductive elastic layer with high grade.

Still another object of the present invention is to provide a mass production process that can manufacture in a good productivity elastic members having conductive or semiconductive elastic layers with high grade.

A further object of the present invention is to provide an electrophotographic apparatus that may less cause charging non-uniformity and can form high-quality electrophotographic images, and a process cartridge usable therein.

The above objects can be achieved by the invention described below.

That is, according to an embodiment of the elastic member, the present invention provides;

<1> an elastic member for electrophotography, comprising a conductive or semiconductive elastic layer, wherein the elastic layer comprises a vulcanized rubber obtained by vulcanizing a material rubber in the presence of at least one sulfur-atom-containing compound selected from group consisting of compounds represented by the following formulas (1) to (4):

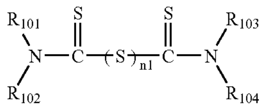
(1)

wherein $R_{101}$ to $R_{104}$ each independently represent a monovalent organic group having 5 or more carbon atoms, and n1 is an integer of 1 to 8;

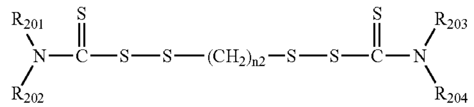
(2)

wherein $R_{201}$ to $R_{204}$ each independently represent a monovalent organic group having 5 or more carbon atoms, and n2 is an integer of 1 to 20;

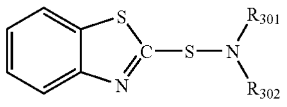
(3)

wherein $R_{301}$ and $R_{302}$ each independently represent a monovalent organic group having 7 or more carbon atoms; and

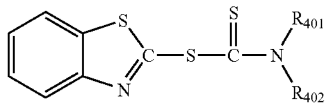
(4)

wherein $R_{401}$ and $R_{402}$ each independently represent a monovalent organic group having 5 or more carbon atoms.

As preferred embodiments of the above elastic member, the following embodiments <2> to <5> may be given.

<2> The elastic member according to embodiment <1>, wherein the sulfur-atom-containing compound selected from the group consisting of compounds represented by the above formulas (1) to (4) is at least one sulfur-atom-containing compound selected from the group consisting of compounds represented by the following formulas (5) to (8):

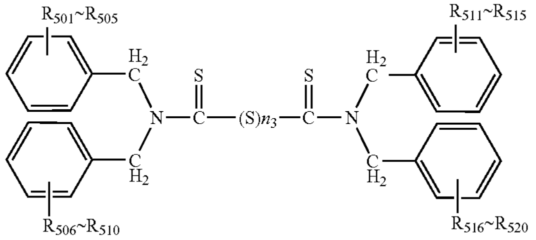
(5)

wherein $R_{501}$ to $R_{520}$ each independently represent a hydrogen atom or a monovalent substituent, and n3 an integer of 1 to 8;

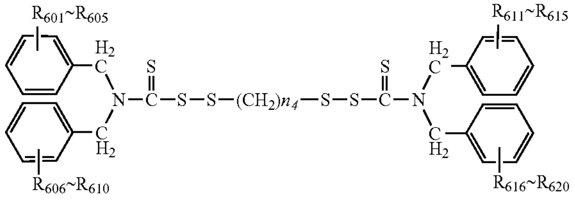
(6)

wherein $R_{601}$ to $R_{620}$ each independently represent a hydrogen atom or a monovalent substituent, and n4 is an integer of 1 to 20;

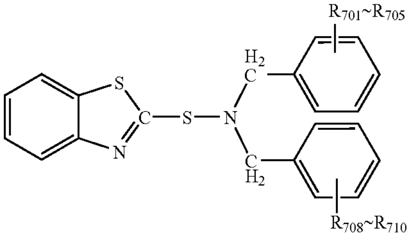
(7)

wherein $R_{701}$ to $R_{710}$ each independently represent a hydrogen atom or a monovalent substituent; and (8)

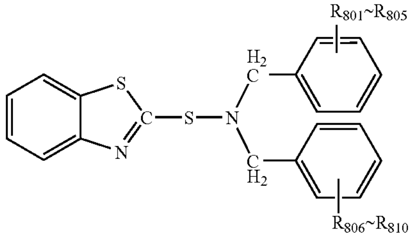

wherein $R_{801}$ to $R_{810}$ each independently represent a hydrogen atom or a monovalent substituent.

<3> The elastic member according to embodiment <1> or <2>, wherein the material rubber is an epichlorohydrin rubber.

<4> The elastic member according to any one of embodiments <1> to <3>, being a roller-shaped member provided with a mandrel whose peripheral surface is covered with the elastic layer.

<5> The elastic member according to any one of embodiments <1> to <4>, being a charging member for charging an electrophotographic photosensitive member.

According to an embodiment of the manufacturing process, the present invention also provides;

<6> a process for manufacturing an elastic member for electrophotography, having a conductive or semiconductive elastic layer; the process comprising the step of:

vulcanizing a material rubber in the presence of at least one sulfur-atom-containing compound selected from the group consisting of compounds represented by the above formulas (1) to (4).

As preferred embodiments of the above elastic member manufacturing process, the following embodiments <7> to <9> may be given.

<7> The process according to embodiment <6>, wherein the sulfur-atom-containing compound selected from the group consisting of compounds represented by the above formulas (1) to (4) is at least one sulfur-atom-containing compound selected from the group consisting of compounds represented by the above formulas (5) to (8).

<8> The process according to embodiment <7>, wherein the material rubber is an epichlorohydrin rubber.

<9> The process according to embodiment <8>, wherein the vulcanizing step is conducted in coexistence with 6-methylquinoxaline-2,3-dithiocarbonate.

According to an embodiment of the mass production process, the present invention still also provides;

<10> a process for mass-producing elastic members for electrophotography, each having a conductive or semiconductive elastic layer; the process comprising the steps of:

(i) extruding an unvulcanized rubber composition containing a material rubber, sulfur and at least one sulfur-atom-containing compound selected from the group consisting of compounds represented by the above formulas (1) to (4), to continuously forming extruded products having a stated shape; and (ii) continuously vulcanizing the extruded products continuously formed in the step (i).

According to an embodiment of the process cartridge, the present invention further provides;

<11> a process cartridge comprising an electrophotographic photosensitive member and the elastic member according to any one of the above embodiments <1> to <5> which are integrally supported, and being detachably mountable to the main body of an electrophotographic apparatus.

As a preferred embodiment of the above process cartridge, the following embodiment <12> may be given.

<12> The process cartridge according to embodiment <11>, wherein the elastic member is a charging member for charging the electrophotographic photosensitive member.

According to an embodiment of the electrophotographic apparatus, the present invention further provides;

<13> an electrophotographic apparatus comprising an electrophotographic photosensitive member and the elastic member according to any one of the above embodiments <1> to <5>.

As a preferred embodiment of the above electrophotographic apparatus, the following embodiment <14> may be given.

<14> The electrophotographic apparatus according to embodiment <13>, wherein the elastic member is a charging member for charging the electrophotographic photosensitive member.

DESCRIPTION OF THE PREFERRED EMBODIMENTS

Figure 1:
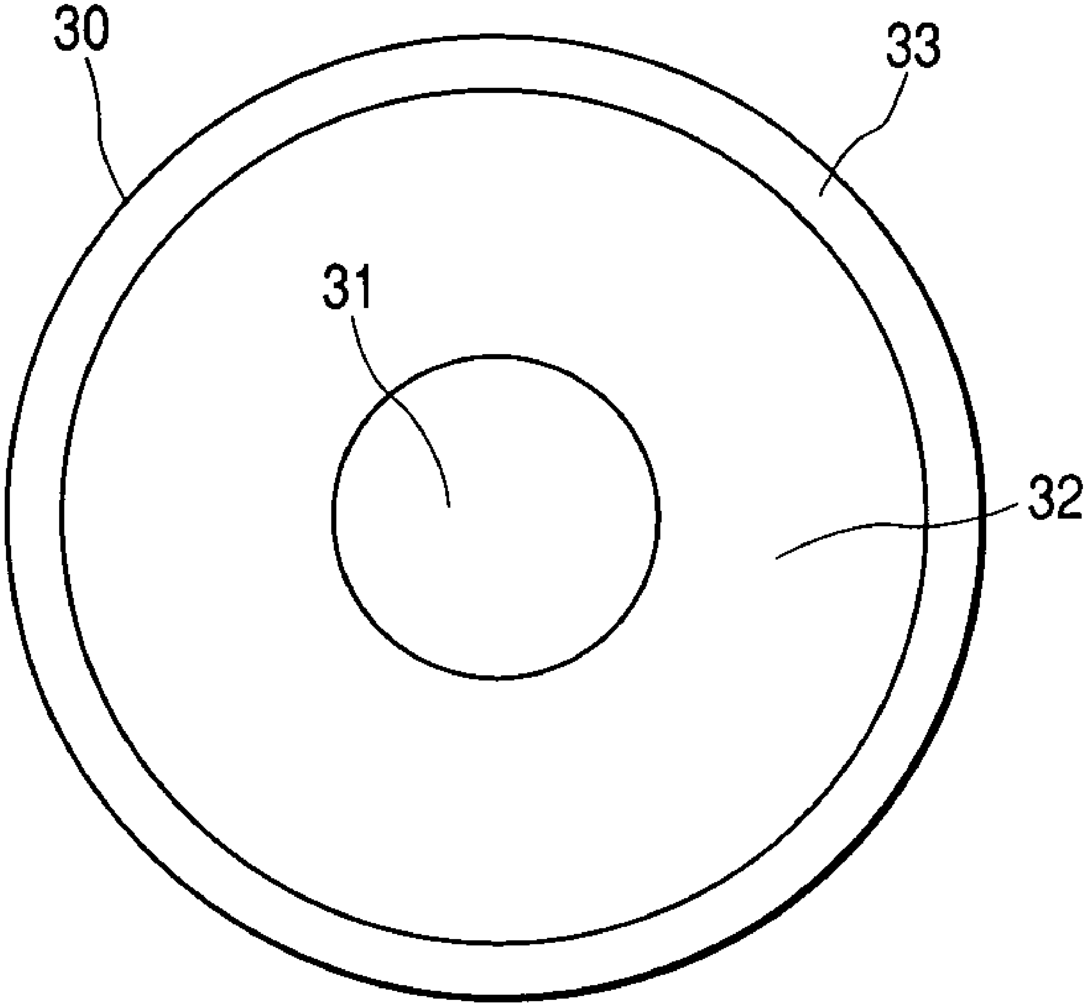
FIG. 1 is a sectional view showing the construction of a charging roller as an example of the elastic member according to the present invention.

The present invention is described below in detail.

The elastic member for electrophotography according to the present invention has a conductive or semiconductive elastic layer, and the elastic layer contains a vulcanized rubber obtained by vulcanizing a material rubber in the presence of at least one sulfur-atom-containing compound selected from the group consisting of compounds represented by the following formulas (1) to (4):

(1)

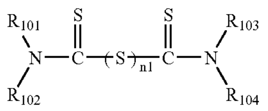

wherein $R_{101}$ to $R_{104}$ each independently represent a monovalent organic group having 5 or more carbon atoms, and n1 is an integer of 1 to 8;

(2)

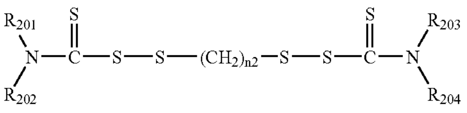

wherein $R_{201}$ to $R_{204}$ each independently represent a monovalent organic group having 5 or more carbon atoms, and n2 is an integer of 1 to 20;

(3)

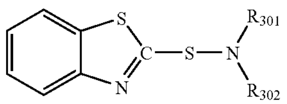

wherein $R_{301}$ and $R_{302}$ each independently represent a monovalent organic group having 7 or more carbon atoms; and (4)

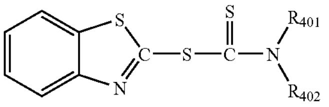

wherein $R_{401}$ and $R_{402}$ each independently represent a monovalent organic group having 5 or more carbon atoms.

The sulfur-atom-containing compounds represented by the above formulas (1) to (4) (hereinafter also "sulfur-atom-containing compounds with specific structures") give superior scorch properties and vulcanization productivity. The reason has not been identified yet, but it has been turned out that, as a result of studies made by the present inventor on various compounds, carbamate type compounds give a short scorch time, i.e. Mooney scorch time, and commercially available thiazole type compounds need longer vulcanization time when used alone. Also, as stated above, commercially available sulfenamide type compounds provide a good balance between scorch properties and vulcanization productivity, but are seen to have tendencies of making vulcanization rate a little low and making vulcanized products worse in permanent set.

It has been turned out that, in the compound represented by the formula (1), i.e. a thiuram compound, a compound whose monovalent organic groups represented by $R_{101}$ to $R_{104}$ have relatively large molecular weights provides especially good balance between scorch properties and vulcanization productivity. It has also been turned out that, in thiuram compounds, a compound having an alkyl group between sulfur atoms, i.e., the compound represented by the formula (2) has the like effect.

As described above, $R_{101}$ to $R_{104}$ in the formula (1) and $R_{201}$ to $R_{204}$ in the formula (2) each independently represent a monovalent organic group having 5 or more carbon atoms, and preferably a monovalent organic group having 5 to 10 carbon atoms, n1 is an integer of 1 to 8, and n2 is an integer of 1 to 20. A case in which the number of carbon atoms of $R_{101}$ to $R_{104}$ and $R_{201}$ to $R_{204}$ is 4 or less or a case in which n1 is 9 or more, the compound may give a short scorch time to make it unable to carry out extrusion at high temperature. Also, a case in which n1 in the formula (1) is 0 or n2 in the formula (2) is 21 or more, the compound makes a vulcanazation very slow and makes productivity poor. The integer n1 may preferably be in the range of from 1 to 4, and the integer n2 may preferably be in the range of from 1 to 10.

The monovalent organic group having 5 or more carbon atoms, each represented by $R_{101}$ to $R_{104}$ in the formula (1) and $R_{201}$ to $R_{204}$ in the formula (2) may include, e.g., a straight-chain or branched-chain alkyl group having 5 to 10 carbon atoms, e.g., a pentyl group, a hexyl group, a heptyl group, an octyl group or a cyclohexyl group etc., and an aryl group, e.g., a phenyl group or a biphenyl group etc. At least one hydrogen atom of the alkyl group may be substituted with a halogen atom such as a fluorine atom, a chlorine atom or a bromine atom etc. or an aryl group such as a phenyl group or a biphenyl group etc. For example, an aralkyl group such as a benzyl group or a phenethyl group etc. can also be at least one of $R_{101}$ to $R_{104}$ and $R_{201}$ to $R_{204}$. A case in which $R_{101}$ to $R_{104}$ in the formula (1) and $R_{201}$ to $R_{204}$ in the formula (2) are benzyl groups is preferred because the compounds have superior cross-linking efficiency, and elastic layers with a smaller permanent set can be obtained. That is, of the compound represented by the formula (1), a compound represented by the following formula (5) is preferred and, of the compound represented by the formula (2), a compound represented by the following formula (6) is preferred:

(5)

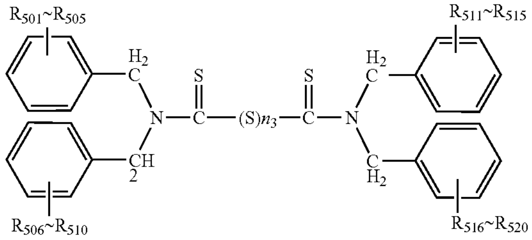

wherein $R_{501}$ to $R_{520}$ each independently represent a hydrogen atom or a monovalent substituent, and n3 is as defined for n1 and is an integer of 1 to 8; and (6)

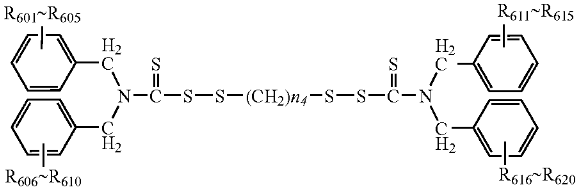

wherein $R_{601}$ to $R_{620}$ each independently represent a hydrogen atom or a monovalent substituent, and n4 is as defined for n2 and is an integer of 1 to 20.

The monovalent substituent each represented by $R_{501}$ to $R_{520}$ in the formula, (5) and $R_{601}$ to $R_{620}$ in the formula (6) may include, e.g., a straight-chain or branched-chain alkyl group having 1 to 3 carbon atoms, e.g., a methyl group, an ethyl group or a propyl group etc., an alkenyl group having 2 to 5 carbon atoms, e.g., a methylene group or an ethylene group etc, and also an amino group, a nitrile group, a carboxyl group, a hydroxyl group, an isocyanate group, an acryloyl group and a halogen atom. It is preferable for the substituents to be hydrogen atoms.

More preferred sulfur-atom-containing compounds are tetrabenzylthiuram disulfide, which is a compound wherein n3 in the formula (5) is 2 and all the sunstituents of $R_{501}$ to $R_{520}$ are hydrogen atoms, and 1,6-bis(N,N'-benzylthiocarbamoyldithio)hexane, which is a compound in the formula (6) wherein n4 is 6 and all the substituents of $R_{601}$ to $R_{620}$ are hydrogen atoms. These compounds provide very good balance between scorch time and vulcanization rate.

In the compound represented by the formula (3), $R_{301}$ and $R_{302}$ each independently represent a monovalent organic group having 7 or more carbon atoms. Here, if $R_{301}$ and $R_{302}$ are each a monovalent organic group having 6 or less carbon atoms, the compound may give a short scorch time. As the result, when high-temperature melt kneading and high-temperature extrusion are carried out for removing water content and volatile components from an unvulcanized rubber composition, the vulcanization may begin to take place to make the unvulcanized rubber begin to cure, making it difficult to carry out extrusion into desired shapes. Here, the monovalent organic group having 7 or more carbon atoms each represented by $R_{301}$ and $R_{302}$ may include, e.g., a straight-chain or branched-chain alkyl group having 7 to 10 carbon atoms, a substituted alkyl group in which at least one hydrogen atom of the above alkyl group has been substituted with a halogen atom or an aryl group (such as a phenyl group or a biphenyl group), and an aryl group (such as a phenyl group which may be substituted with a straight-chain or branched-chain alkyl group having 1 to 4 carbon atoms, and a biphenyl group which may be substituted with a straight-chain or branched-chain alkyl group having 1 to 4 carbon atoms).

Further, with regard to the compound represented by the formula (4), $R_{401}$ and $R_{402}$ each independently represent a monovalent organic group having 5 or more carbon atoms, and may specifically include the same groups as those for $R_{101}$ to $R_{104}$ in the formula (1). Then, in the sulfur-atom-containing compounds represented by the formulas (3) and (4), those especially preferably usable in the present invention are a compound wherein $R_{301}$ and $R_{302}$ are both benzyl groups and a compound wherein $R_{401}$ and $R_{402}$ are both benzyl groups in the formulas (3) and (4), respectively. Stated specifically, they are those represented by the following formulas (7) and (8).

(7)

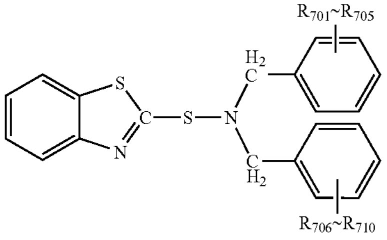

-continued (8)

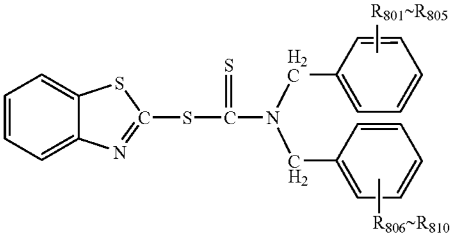

$R_{701}$ to $R_{705}$ and $R_{706}$ to $R_{710}$ in the formula (7) and $R_{801}$ to $R_{805}$ and $R_{806}$ to $R_{810}$ in the formula (8) each independently represent a hydrogen atom or a monovalent substituent. Stated specifically, it may include, e.g., a straight-chain or branched-chain alkyl group having 1 to 3 carbon atoms, e.g., a methyl group or an ethyl group etc., an alkenyl group having 2 to 5 carbon atoms, e.g., a methylene group or an ethylene group etc., and also an amino group, a nitrile group, a carboxyl group, a hydroxyl group, an isocyanate group, an acryloyl group and a halogen atom. It is preferable for the substituents to be hydrogen atoms.

Any of the above sulfur-atom-containing compounds with specific structures is used together with at least a material rubber and a vulcanizing agent sulfur to prepare an unvulcanized rubber composition.

The above sulfur-atom-containing compounds with specific structures may each be used in plural kinds. These may each also be used in combination with any commonly available vulcanization accelerator other than the above sulfur-atom-containing compounds with specific structures as long as it does not inhibit the effect of the present invention. In the case that commonly available vulcanazation accelerator is used together with the above sulfer-atom-containing compounds with specific structure, the sulfur-atom-containing compounds with specific structures may each preferably be in an amount of 20% by weight or more based on the weight of all vulcanization accelerators in the unvulcanized rubber composition.

The unvulcanized rubber composition may preferably be incorporated with the sulfur in an amount of from 0.1 to 3.0 parts by weight based on 100 parts by weight of the material rubber. Incorporation of the sulfur enables acceleration of vulcanization rate without affecting scorch time greatly. It also makes the elastic layer have small breaking extension, and improves polish properties of the elastic layer especially, that is beneficial when its size is regulated by polishing. The sulfur may more preferably be compounded in an amount of from 0.3 to 1.5 parts by weight based on 100 parts by weight of the material rubber.

The vulcanized rubber constituting the elastic layer of the elastic member according to the present invention may preferably have a conductivity or semiconductivity of from $1\times10^3$ to $1\times10^{10}$ Ω·cm as volume resistivity, which may preferably be set within this range according to uses of the elastic member. To make up such a conductive or semiconductive vulcanized rubber, an electronic-conduction type rubber prepared by compounding an insulating material rubber such as ethylene-propylene rubber or butyl rubber with conductive particles such as carbon black or an ionic-conduction type rubber whose rubber itself has conductivity or semiconductivity such as an epichlorohydrin rubber or an acrylonitrile-butadiene copolymer may be employed as the material rubber. Thus, such a conductive or semiconductive layer can be obtained.

As the material rubber, it may preferably be a rubber having good durability in ozone, and having no double bond in the backbone chain. It is also preferable to use an ionic-conduction type rubber, which makes it able to obtain an elastic layer having uniform electrical resistance. As the ionic-conduction type rubber, an epichlorohydrin rubber is preferred especially in view of an advantage that the elastic layer can be made low-resistance. The epichlorohydrin rubber may specifically be any of epichlorohydrin homopolymer (CHC), an epichlorohydrin-ethylene oxide copolymer (CHR) and an epichlorohydrin-ethylene oxide-allylglycidyl ether terpolymer (CHR-AGE). A mixture of two or more of these may also be used. In particular, the epichlorohydrin-ethylene oxide-allylglycidyl ether terpolymer (CHR-AGE) is more preferred as having a double bond in the side chain and having a high vulcanization rate.

The material rubber may also be used in the form of a blend of the above epichlorohydrin rubber with an acrylonitrile-butadiene copolymer (NBR), a hydrogenated acrylonitrile-butadiene copolymer (H-NBR), a chloroprene rubber (CR), an acrylic rubber (ACM, ANM) or a urethane rubber, as long as such a blend does not affect ozone resistance.

In the case when the epichlorohydrin rubber is used as the material rubber, 6-methylquinoxaline-2,3-dithiocarbonate may preferably be compounded as a vulcanization accelerator in order to prevent the value of permanent set from lowering on shortening vulcanization time. The 6-methylquinoxaline-2,3-dithiocarbonate may preferably be compounded in an amount of from 0.3 to 3.0% by weight based on the weight of the material rubber (epichlorohydrin rubber).

To the unvulcanized rubber composition (material rubber composition), an ionic conductive agent may be added for the purpose of regulating electrical resistance. The ionic conductive agent may include, e.g., inorganic ionic substances such as lithium perchlorate, sodium perchlorate and calcium perchlorate; cationic surface-active agents such as lauryl trimethylammonium chloride, stearyl trimethylammonium chloride, octadecyl trimethylammonium chloride, dodecyl trimethylammonium chloride, hexadecyl trimethylammonium chloride, trioctyl propylammonium bromide, modified aliphatic dimethyl ethylammonium ethosulfate; amphoteric surface-active agents such as laurylbetaine, stearylbetaine, dimethylalkyl laurylbetaine; quaternary ammonium salts such as tetraethylammonium perchlorate, tetrabutylammonium perchlorate and trimethyloctadecylammonium perchlorate; and organic acid lithium salts such as lithium trifluoromethane sulfonate.

In addition, to the unvulcanized rubber composition, a filler, a softening agent, a processing aid, a vulcanization auxiliary agent, a vulcanization accelerator other than the above, a vulcanization accelerator activator, a vulcanization retarder, a tackifier, a dispersant and so forth may optionally be added which are commonly used as compounding agents for rubbers.

Also where the elastic layer is formed in a spongy rubber, the use of the vulcanization accelerator according to the present invention is effective from the viewpoint that the voids in the unvulcanized rubber serves as nuclei and the cell diameter is prevented from coming non-uniform because of abnormal blowing of the spongy rubber. In the case when the elastic layer is formed in such a spongy rubber, an organic blowing agent such as dinitrosopentamethylenetetramine (DPT), azodicarbonamide (ADCA), p-toluenesulfonyl hydrazide (TSH), azobisisobutylontirile and 4,4'-oxybisbenzenesulfonyl hydrazide (OBSH) or an inorganic blowing agent such as sodium bicarbonate may be compounded in the unvulcanized rubber composition.

The elastic member according to the present invention may favorably be used as a charging member of electrophotographic apparatus in particular, as a roller-shaped charging member (charging roller). Besides the charging member, it may also favorably be used as a member required to have conductivity and elasticity, as exemplified by a developing member, a transfer member, a charge elimination (destatisizing) member, and a transport member such as a paper feed roller, used in electrophotographic apparatus.

A case in which the conductive elastic member for electrophotography according to the present invention is used as a charging roller is described below as an example. FIG. 1 shows the construction of a charging roller 30 as an example of the elastic member for electrophotography according to the present invention. The charging roller 30 has a mandrel 31 made of a metal, and provided on its periphery an elastic layer 32 containing the vulcanized rubber obtained by vulcanizing the material rubber in the presence of at least one sulfur-atom-containing compound selected from the compounds represented by the formulas (1) to (4) and a surface coat layer 33 which covers the periphery of the elastic layer 32. Here, the elastic layer may preferably have a volume resistivity of from $1\times10^3$ to $1\times10^9$ Ω·cm so that a charging voltage can be applied to an electrophotographic photosensitive member.

The surface coat layer 33 may preferably have a volume resistivity of from $1\times10^6$ to $1\times10^{12}$ Ω·cm. The surface coat layer 33 is constituted of, e.g., a binder resin such as acrylic resin, polyurethane resin, polyamide resin, polyester resin, polyolefin resin or silicone resin in which any of i) conductive particles the particle surfaces of which have been coated with carbon black, graphite, an oxide such as titanium oxide or tin oxide or a metal such as copper or silver to provide conductivity, ii) an inorganic ionic electrolyte such as $LiClO_4$, KSCN, NaSCN or $LiCF_3SO_3$ and iii) a quaternary ammonium salt has been dispersed in a suitable quantity so as to have the desired electrical resistance value. Incidentally, besides the elastic layer and the surface coat layer, the charging roller may also optionally be provided with a functional layer such as an adhesion layer, a diffusion preventive layer, a subbing layer or a primer layer.

Figure 2:
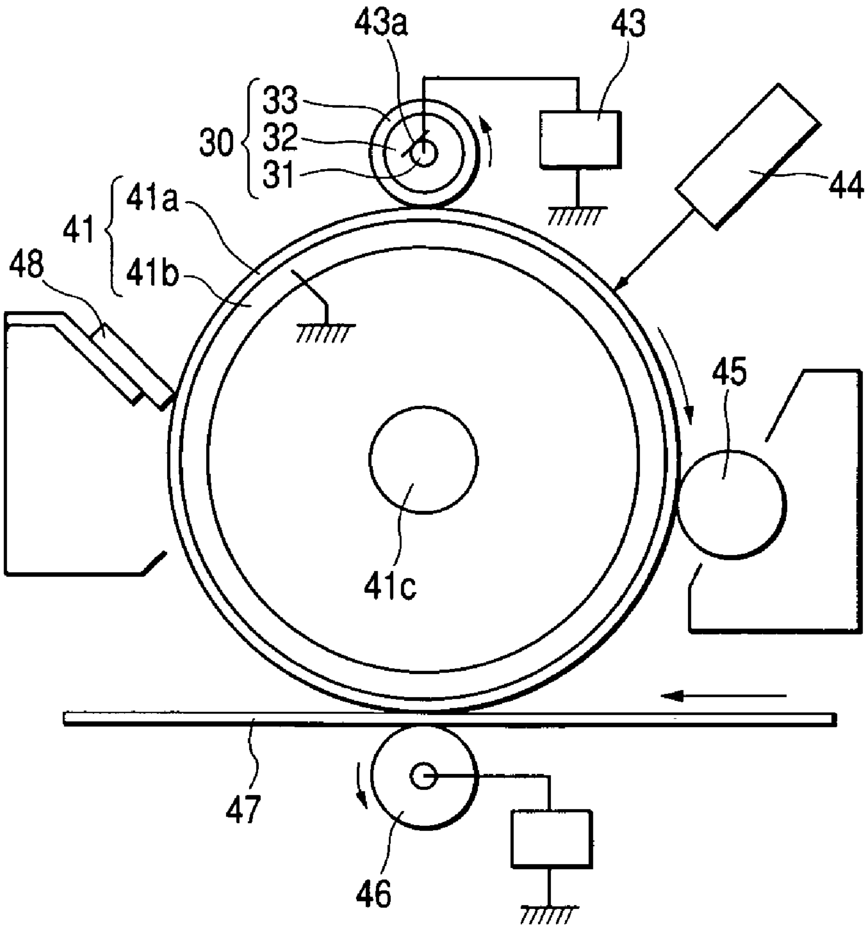
FIG. 2 is a schematic sectional view showing the construction of an electrophotographic apparatus making use of the charging roller shown in FIG. 1.

FIG. 2 schematically shows the construction of an electrophotographic apparatus having this charging roller. Reference numeral 41 denotes an electrophotographic photosensitive member as a charging object member. The electrophotographic photosensitive member in this example is a drum-shaped electrophotographic photosensitive member having as basic constituent layers a support 41*b* having conductivity, made of aluminum or the like and, formed on the support 41*b*, a photosensitive layer 41*a*. It is rotatingly driven around an axis 41*c* in the clockwise direction as viewed on the drawing, at a stated peripheral speed.

Reference numeral 30 denotes a charging roller which is disposed in contact with the surface of the electrophotographic photosensitive member 41 and charges (primarily charges) the surface of the electrophotographic photosensitive member to a stated polarity and potential. The charging roller 30 consists of a mandrel 31, an elastic layer 32 formed on the mandrel 31, and a surface coat layer 33 further formed on the elastic layer 32. It is pressed against the electrophotographic photosensitive member 41 under application of pressure at both ends of the mandrel 31 by means of a pressure means (not shown), and is follow-up driven as the electrophotographic photosensitive member 41 is rotatingly driven.

A stated direct-current (DC) bias or direct-current plus alternating-current (DC+AC) bias is applied from a power source 43 to the mandrel 31 through a rubbing-friction electrode 43*a*, whereupon the surface of the electrophotographic photosensitive member 41 is contact-charged to a stated polarity and potential. The electrophotographic photosensitive member 41 the peripheral surface of which has been uniformly charged by means of the charging roller 30 is subsequently subjected to exposure, e.g., laser beam scanning exposure, or slit exposure of images of an original etc. of intended image information by means of an exposure means 44, whereupon electrostatic latent images corresponding to the image information are formed on the peripheral surface of the electrophotographic photosensitive member 41.

The electrostatic latent images are then successively developed on into visible images as toner images by a developing member 45. The toner images thus formed are then successively transferred by a transfer means 46 to a transfer material 47 transported from a paper feeder, which is not shown in FIG. 2, to a transfer zone between the electrophotographic photosensitive member 41 and the transfer means 46 at proper timing in the manner synchronized with the rotation of the electrophotographic photosensitive member 41. The transfer means 46 in this example is a transfer roller, which is charged to a polarity reverse to that of toner from the back of the transfer material 47, whereupon the toner images on the electrophotographic photosensitive member 41 side are transferred on, to the transfer material 47.

The transfer material 47 to which the toner images have been transferred is separated from the surface of the electrophotographic photosensitive member 41 and then transported to a fixing means, which is not shown in FIG. 2, where the toner images are fixed. The transfer material with fixed images is put out as an image-formed matter. Instead, where images are also formed on the back, the transfer material 47 with fixed images is transported to a means for re-transport (not shown) to the transfer zone.

The peripheral surface of the electrophotographic photosensitive member 41 from which the toner images have been transferred is cleaned by a cleaning member 48 to remove adherent contaminants such as residual toner which fails to be transferred to the transfer material 47. Its surface having been thus cleaned is repeatedly used for image formation.

The charging roller 30 may be follow-up driven to the electrophotographic photosensitive member 41 which is driven with surface movement, or may be set unrotatable, or may be positively rotatingly driven at a stated peripheral speed in the forward direction or backward direction in respect to the direction of the surface movement of the electrophotographic photosensitive member 41.

In the case when the electrophotographic apparatus is used as a copying machine, the exposure is performed using light reflected from, or transmitted through, an original, or by the scanning of a laser beam, the driving of an LED array or the driving of a liquid crystal shutter array according to signals obtained by reading an original and converting the information into signals.

The electrophotographic photosensitive member in which the conductive elastic member for electrophotography according to the present invention is usable may include copying machines, laser beam printers, and apparatus where electrophotography is applied, such as electrophotographic platemaking systems.

The conductive elastic member for electrophotography according to the present invention may be used as, besides the charging member such as the charging roller, a developing member, a transfer member, a charge elimination (destatisizing) member, and a transport member such as a paper feed roller.

Figure 5:
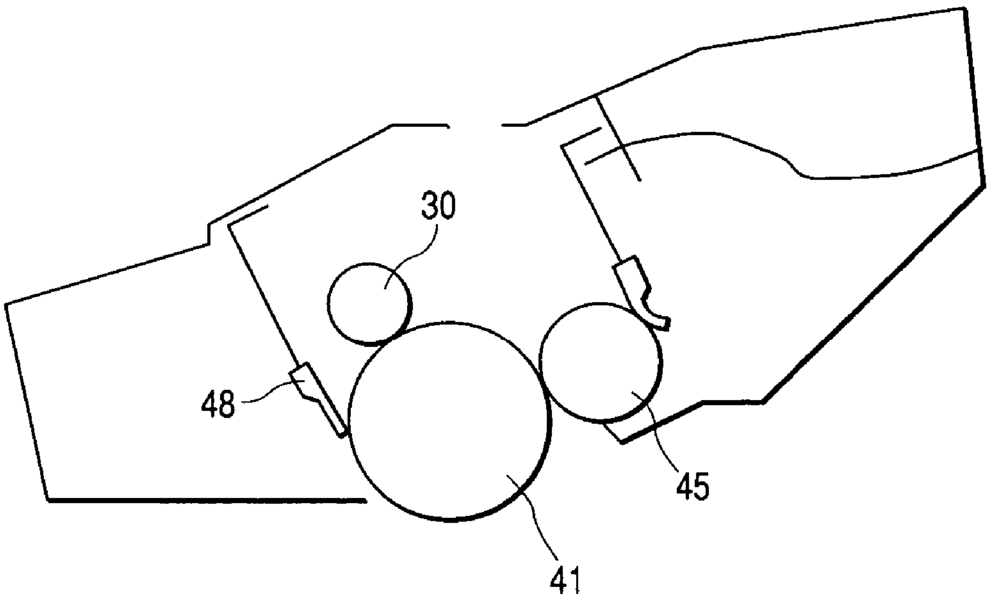
FIG. 5 is a schematic sectional view showing the construction of a process cartridge having the charging roller according to the present invention.

In the present invention, as shown in FIG. 5, a plurality of components of the electrophotographic apparatus, such as the electrophotographic photosensitive member 41, the charging member 30, the developing member 45 and the cleaning member 48 may integrally be set as a process cartridge. The process cartridge may be so constructed as to be detachably mountable to the main body of the electrophotographic apparatus. For example, the charging member according to the present invention and the electrophotographic photosensitive member, and optionally further the developing means and the cleaning means, may integrally be set as a process cartridge so that the process cartridge is detachably mountable through a guide means such as rails provided in the main body of the image-forming apparatus.

As described above, the vulcanization accelerator according to the present invention can not easily cause scorching even when the unvulcanized rubber composition is extruded at high temperature, and also promises high vulcanization rate, making it possible to obtain a high-grade elastic member.

EXAMPLES

The present invention is described below in greater detail by giving Examples. These by no means limit the present invention. In the following, "part(s)" refers to "part(s) by weight" unless particularly noted. As reagents and the like, commercially available high-purity products are used unless particularly specified.

Example 1

Example in which the elastic member according to the present invention is applied to a charging roller:

Example 1-1

Charging Roller 1:

100 parts of an epichlorohydrin-ethylene oxide-allylglycidyl ether terpolymer (trade name: EPICHLOMER CG102; available from Daiso K.K.) as a material rubber, 1 part of stearic acid as a processing aid, 5 parts of zinc oxide as a vulcanization accelerator activator, 30 parts of calcium carbonate (trade name: SILVER W; available from Shiraishi Kogyo Kaisha, Ltd.) as a filler, 10 parts of SRF carbon black (trade name: ASAHI #35; available from Asahi Carbon Co., Ltd.), 5 parts of a sebacic-acid polyester plasticizer (molecular weight: 8,000) and 1 part of tetrabuthylammonium perchlorate as an ionic conductive agent were mixed by means of a pressure kneader to obtain an A-stage kneaded rubber composition.

In 152 parts of this A-stage kneaded rubber composition, 1.0 part of sulfur as a vulcanizing agent, 1 part of dibenzothiazyl disulfide (trade name: NOCCELER DM; available from Ouchi-Shinko Chemical Industrial Co., Ltd.) as vulcanization accelerator 1 and 1 part of tetrabenzylthiuram disulfide (trade name: PERKACIT-TBzTD; available from Flexsys Co.) as vulcanization accelerator 2 were mixed by means of an open roll to obtain an unvulcanized rubber composition.

On the unvulcanized rubber composition thus obtained, a Mooney scorch test was conducted. To conduct the test, a Mooney viscometer Model SMV-200, manufactured by Shimadzu Corporation, was used to measure the t5 at 100° C. according to the JIS-K6300 physical test method of unvulcanized rubber and using an L-rotor. As the result, the scorch time was found to be 59 minutes.

Next, cylindrical conductive mandrels of 6 mm in diameter and 256 mm in length each, made of steel, and surface-coated with nickel were coated with a metal-to-rubber heat-curable adhesive, trade name: METALOC U-20; available from Toyo Chemical Laboratory Inc.) on the cylinder surfaces at their 231 mm middle portions in the axial direction, followed by drying at 80° C. for 30 minutes and thereafter drying at 120° C. for 1 hour.

These mandrels and the above unvulcanized rubber composition were co-extruded by means of a vented extruder fitted with a crosshead (a vented extruder of 50 mm in diameter; L/D: 16; manufactured by EM Giken K.K.) to form unvulcanized rubber of 15 mm in outer diameter on the periphery of each mandrel.

Figure 3:
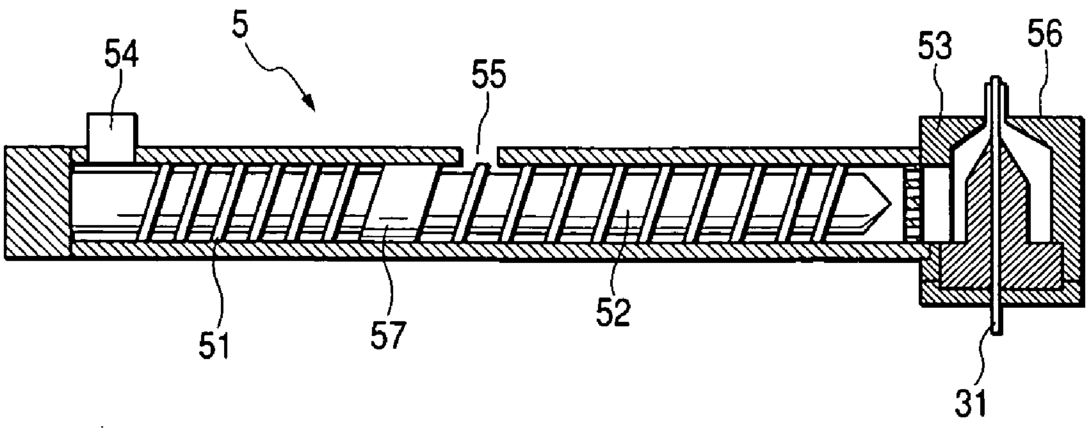
FIG. 3 is a schematic sectional view showing the construction of a vented extrusion equipment fitted with a crosshead.

FIG. 3 schematically shows the construction of a vented extruder 5. The extruder 5 has a cylinder 51 to the interior of which an extrusion screw 52 is rotatably inserted. A crosshead 53 is attached to an end portion of the cylinder 51 on the forward end side of the screw 52. The cylinder 51 is provided with a vent hole 55. The vent hole 55 is connected to a vacuum pump (not shown), and the inside of the cylinder 51 is evacuated by means of the vacuum pump. The unvulcanized rubber introduced therein through a material feed opening 54 is transported toward the crosshead 53 as the extrusion screw 52 is rotated. Here, the unvulcanized rubber is passed through a dam 57 provided in the screw 52 and is transported to the crosshead 53, during which the unvulcanized rubber is vacuum-drawn, so that volatile components in the unvulcanized rubber are removed. The unvulcanized rubber having been transported to the crosshead 53 is laid onto the periphery of each mandrel 31 fed thereto by means of a mandrel feeder (not shown), passed through a die 56 at the forward end of the crosshead 53, and then co-extruded together with each mandrel 31. The cylinder 51, screw 52 and crosshead 53 of the extruder 5 are each kept to a temperature having been appointed by a temperature controller.

The temperature control of the extruder in this Example was so made that all the cylinder, screw and crosshead were set to 90° C. The number of revolutions of the screw was 16 rpm. Extrusion was carried out for 2 hours. From the beginning of the extrusion, the surface roughness of extruded products was visually observed, where a case in which no change in roughness was seen was judged that no scorch came about. In this Example, no scorch of rubber was seen even in a lapse of 2 hours after the start of extrusion.

Figure 4:
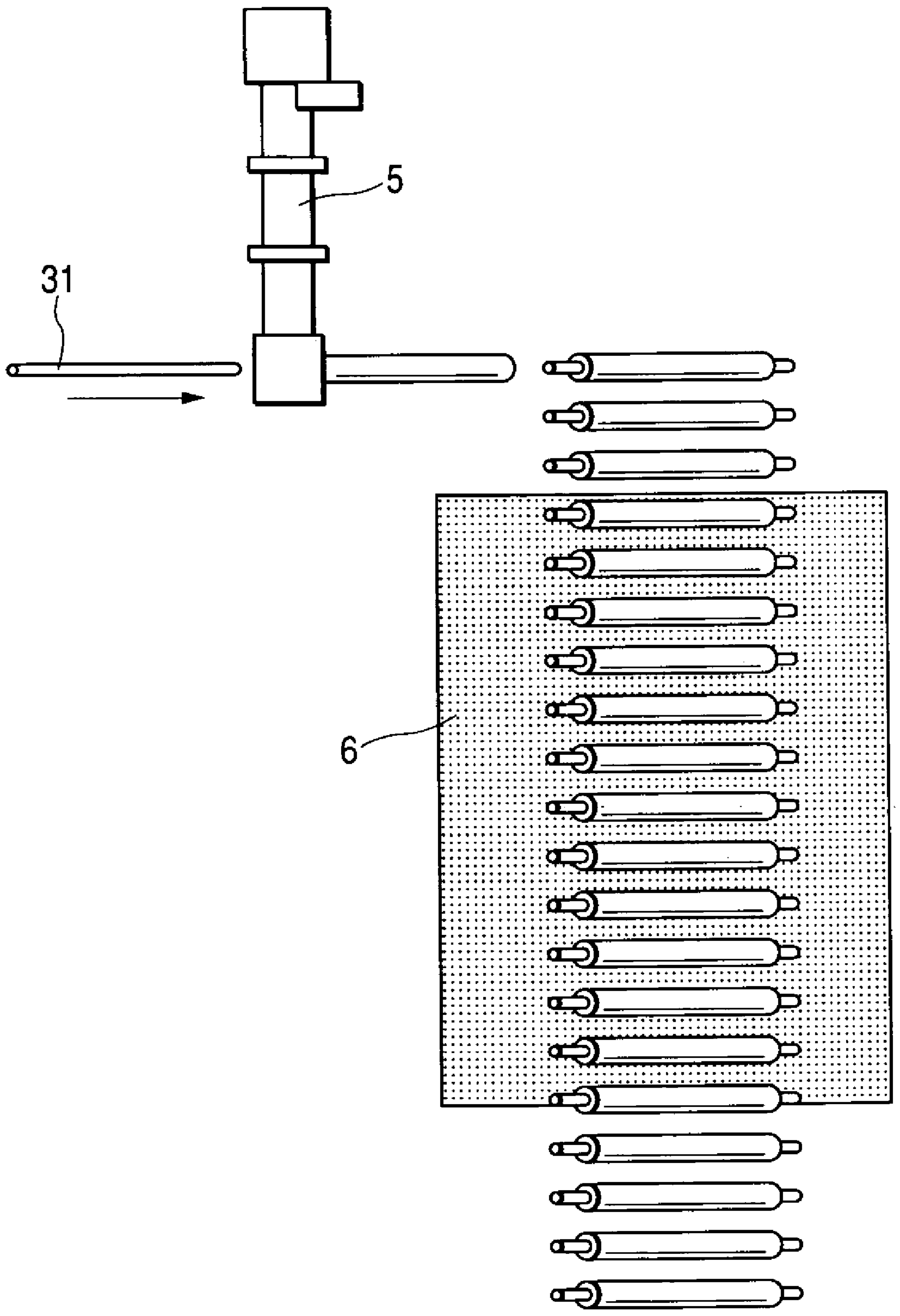
FIG. 4 is a schematic view showing the construction of an equipment for continuously vulcanizing rollers extruded from the crosshead extrusion equipment.

FIG. 4 schematically shows the construction of an equipment for continuously vulcanizing rollers extruded from the extruder. Unvulcanized rubber rollers each having the unvulcanized rubber laid on the periphery of the mandrel 31 are continuously transported to a vulcanizing furnace 6 by means of a transport conveyor (not shown). The vulcanizing furnace 6 is beforehand kept at a preset temperature, where the unvulcanized rubber rollers are vulcanized for a preset time depending on the speed at which they are transported and the length of the vulcanizing furnace 6. In this Example, the temperature of the vulcanizing furnace 6 was 180° C., and the vulcanization time (vulcanizing furnace pass time) was 30 minutes. Rubber both ends of the rollers having been thus vulcanized were cut off to make their rubber portions each have a length of 231 mm. Thereafter, the rubber portions were polished with a rotary hone to obtain rubber rollers each having a crown-shaped elastic layer of 12.00 mm in end-portion diameter and 12.10 mm in middle-portion diameter.

Figure 6:
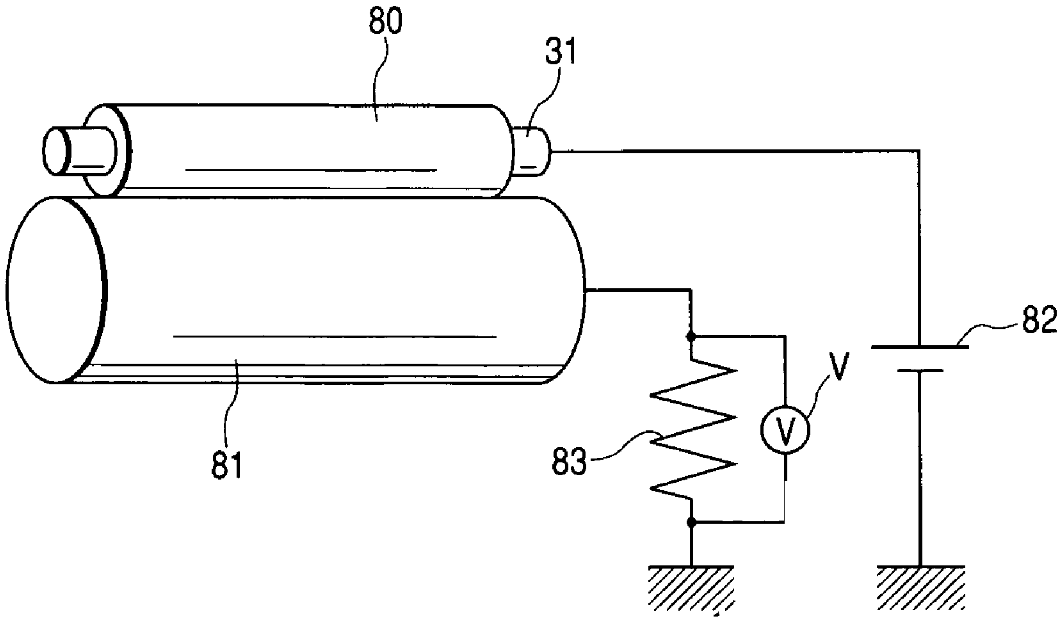
FIG. 6 is a schematic view showing the construction of an instrument for measuring electrical resistance of the elastic layer of the elastic member according to the present invention.

FIG. 6 schematically shows the construction of an instrument for measuring electrical resistance of a rubber roller 80 (elastic layer of electrophotographic conductive elastic member). The rubber roller 80 is brought into pressure contact with a cylindrical aluminum drum 81 by a pressure means (not shown) which presses both ends of the mandrel 31, and is follow-up rotated as the aluminum drum 81 is rotatingly driven. In this state, a DC current is applied from a power source 82 to the mandrel 31 of the rubber roller 80. The voltage applied to a resistance 83 connected in series to the aluminum drum 81 is measured with a voltmeter V. From the value thus measured, the electrical resistance of the rubber roller 80 is calculated. The value of electrical resistance of the rubber roller 80 was found in a normal-temperature and normal-humidity (N/N: 23° C./50% RH) environment, using the instrument shown in FIG. 6, and under application of a DC voltage of 100 V across the mandrel and the aluminum drum. As the result of the foregoing, the electrical resistance value of the rubber rollers (elastic layers) of this Example in N/N was found to be $7.2\times10^5$ Ω.

On each elastic layer of the above rubber rollers, a surface layer shown below was formed by coating to produce charging rollers 1. First, 500 parts of a 1% isopropyl alcohol solution of trifluoropropyltrimethoxysilane and 300 parts of glass beads of 0.8 mm in average particle diameter were added to 50 parts of conductive tin oxide powder (trade name: SN-100P; available from Ishihara Sangyo Kaisha, Ltd.), followed by dispersion for 70 hours by means of a paint shaker. Thereafter, the dispersion obtained was filtered with a 500-mesh net, and then this filtered dispersion was heated by a 100° C. hot bath with stirring by means of a Nauta mixer, to drive off the alcohol to dryness to provide the particle surfaces with the silane coupling agent. Thus, surface-treated conductive tin oxide powder was obtained.

Next, 200 parts of a lactone-modified acrylic polyol (trade name: PLACCEL DC2009; available from Daicel Chemical Industries, Ltd.) was dissolved in 500 parts of MIBK (methylisobutyl ketone) to form a solution with a polyol concentration of 20% by weight. In 200 parts of this acrylic polyol solution, 50 parts of the above surface-treated conductive tin oxide powder, 0.01 part of silicone oil (trade name: SH-28PA; available from Dow Corning Toray Silicone Co., Ltd.) and 1.2 parts of fine silica particles (primary particle diameter: 0.02 μm) surface-treated with hexamethylenedisilazane were mixed, and 200 parts of glass beads of 0.8 mm in diameter were added thereto. These were put into a 450 ml bottle, and subjected to dispersion for 10 hours using a paint shaker.

In 370 parts of the dispersion thus obtained, 33.5 parts of a block type isocyanurate type trimer of isophorone diisocyanate (trade name: VEATANAT B1370; available from Degussa Hüls Japan Ltd.) and 21.5 parts of an isocyanurate type trimer of hexamethylene diisocyanate (trade name: DURANATE TPA-B80E; available from Asahi Chemical Industry Co., Ltd.) were mixed, followed by stirring for 1 hour by means of a ball mill, and finally filtration of the solution with a 500-mesh net to obtain a surface-layer-forming coating material.

With this coating material, the surfaces of the rubber rollers each having the above elastic layer was coated by dip coating. These were coated at a draw-up rate of 320 mm/min, followed by air-drying for 30 minutes. Thereafter, the axial direction in coating the rollers was reversed, and the rollers were again coated at a draw-up rate of 320 mm/min, followed by again air-drying for 30 minutes, and further followed by drying at 160° C. for 100 minutes to obtain the charging rollers 1.

The surfaces of the charging rollers 1 thus obtained were visually observed to check defects. As the result, no defective portion was seen on the charging roller surfaces. One of the charging rollers 1 was set in the process cartridge shown in FIG. 5, and images were reproduced using the electrophotographic apparatus shown in FIG. 2 (trade name: LASER SHOT LBP-2510, manufactured by CANON INC.) to make evaluation.

To make image evaluation, applying only a DC voltage to the mandrel of the charging roller 1 so as to make the electrophotographic photosensitive member have a surface potential of −500 V, halftone images were formed to make evaluation. As the result, homogeneous and good reproduced images were obtained.

Next, this process cartridge was detached and then left for 30 days in an environment of 40° C./95% RH, and thereafter again set in the electrophotographic apparatus to form images after "severe-environment leaving". As the result, any faulty images due to any permanent set of the charging roller 1 was not seen, and reproduced images with good quality level were obtained.

Examples 1-2 to 1-4

Charging Rollers 2 to 4:

Materials shown in Table 1 were mixed by means of an open roll to obtain unvulcanized rubber compositions. On the unvulcanized rubber compositions thus obtained, the Mooney scorch test was conducted in the same manner as in Example 1-1, and the scorch time was measured.

Next, using these unvulcanized rubber compositions, rubber rollers were produced under the same conditions as those in Example 1-1, the electrical resistance value of the elastic layer was measured. In the step of extrusion, observation was also made on whether or not the scorch was seen in a lapse of 2 hours after the start of extrusion.

Surface layers were further formed in the same manner as in Example 1-1 on the peripheries of the rubber rollers obtained, to produce charging rollers 2 to 4. On these charging rollers, their surfaces were visually observed and images were reproduced using the electrophotographic apparatus to make evaluation both in the same manner as in Example 1-1. The results obtained are shown in Table 1.

Comparative Example 1

Charging Roller 5:

Materials shown in Table 1 were mixed by means of an open roll to obtain an unvulcanized rubber composition. On the unvulcanized rubber composition thus obtained, the Mooney scorch test was conducted in the same manner as in Example 1-1, and the scorch time was measured. As the result, the scorch time was 22 minutes. The unvulcanized rubber composition was extruded under the same conditions as those in Example 1-1. As the result, a change was visually seen in surface roughness of the extruded products in a lapse of 50 minutes after the start of extrusion, where the surface roughness became greatly large and the scorch of rubber was seen. The results of the foregoing are shown together in Table 1.

Comparative Example 2

Charging Roller 6:

An unvulcanized rubber composition with the same formulation as that in Comparative Example 1 was extruded in the same manner as in Comparative Example 1 except that the temperature control of the extruder was so made that all the cylinder, screw and crosshead were set to 70° C. As the result, no scorch was seen even in a lapse of 2 hours after the start of extrusion.

Next, extrusion, vulcanization and polishing were carried out in the same manner as in Example 1-1 except that this unvulcanized rubber composition was used. The electrical resistance value of the elastic layer was measured in the same manner as in Example 1-1 to find that it was $6.9\times10^5$ Ω. In the step of extrusion, no scorch was also seen even in a lapse of 2 hours after the start of extrusion.

Surface layers were further formed in the same manner as in Example 1-1 on the surfaces of the rubber rollers obtained, to produce charging rollers 6. On these charging rollers 6, their surfaces were visually observed and images were reproduced using one charging roller 6 in the electrophotographic apparatus to make evaluation both in the same manner as in Example 1-1. As the result, defective portions were seen on the charging roller surface. In the image evaluation as well, black spotlike faulty images were seen which were due to faulty charging at the defective portions. This was considered due to the following: The water content and so forth having remained in the unvulcanized rubber composition were not well removed at the time of extrusion because the extrusion temperature of the unvulcanized rubber composition was dropped to 70° C. Hence, the water content and so forth having remained in the unvulcanized rubber composition were vaporized or volatilized by the heat at the time of vulcanization, so that voids had formed.

Comparative Example 3

Charging Roller 7:

Materials shown in Table 1 were mixed by means of an open roll to obtain an unvulcanized rubber composition. On the unvulcanized rubber composition thus obtained, the Mooney scorch test was conducted in the same manner as in Example 1-1. As the result, even in measurement for 120 minutes, the rise in Mooney viscosity was less than 5 mooneys, and no t5 was observed in the measurement time.

Next, extrusion, vulcanization and polishing were carried out in the same manner as in Example 1-1 except that this unvulcanized rubber composition was used. The electrical resistance value of the elastic layer was measured in the same manner as in Example 1-1 to find that it was $7.5\times10^5$ Ω. In the step of extrusion, no scorch was also seen even in a lapse of 2 hours after the start of extrusion.

Surface layers were formed in the same manner as in Example 1-1 on the surfaces of the rubber rollers to produce charging rollers 7. On the charging rollers 7, their surfaces were visually observed and images were reproduced using one charging roller 7 in the electrophotographic apparatus to make evaluation both in the same manner as in Example 1-1. As the result, no defective portion was seen on the charging roller surface. In the image evaluation as well, homogeneous and good images were obtained.

Images were also formed after the severe-environment leaving of the charging roller 7. As the result, faulty images were seen which were due to permanent set of the charging roller 7. This was considered due to the vulcanization carried out using the vulcanization accelerator 7, which had made the elastic layer have a low value of permanent set.

Comparative Example 4

Charging Roller 8:

Materials shown in Table 1 were mixed by means of an open roll to obtain an unvulcanized rubber composition. On the unvulcanized rubber composition thus obtained, the Mooney scorch test was conducted in the same manner as in Example 1-1. As the result, the scorch time was 45 minutes.

The unvulcanized rubber composition was extruded under the same conditions as those in Example 1-1. As the result, a change was visually seen in surface roughness of the extruded products in a lapse of 100 minutes after the start of extrusion, where the surface roughness became greatly large and the scorch of rubber was seen. The results of the foregoing evaluation are shown together in Table 1.

Structures of the vulcanization accelerators 1 to 8 are shown below.

Vulcanization Accelerator 1:
Dibenzothiazyl Disulfide

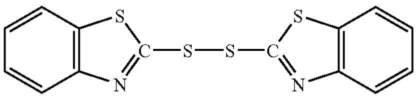

Vulcanization Accelerator 2:
Tetrabenzylthiuram Disulfide

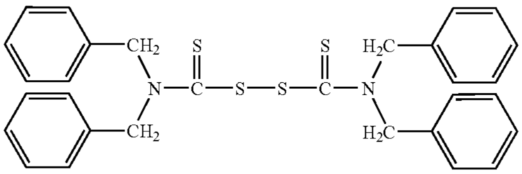

Vulcanization Accelerator 3:
Tetrakis(2-ethylhexyl)thiuram Sulfide

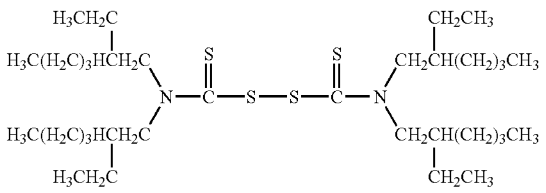

Vulcanization Accelerator 4:
1,6-bis(N,N'-benzylthiocarbamoyldithio)hexane

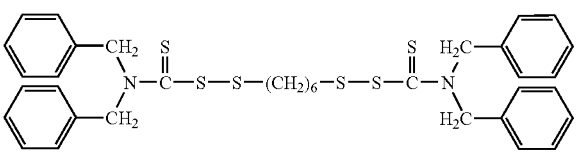

Vulcanization Accelerator 5:
Zinc Dibutyldithiocarbamate

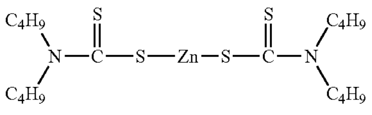

Vulcanization Accelerator 6:
6-methylquinoxaline-2,3-dithiocarbonate

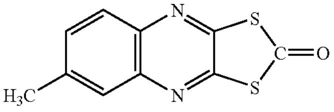

Vulcanization Accelerator 7:
N-cyclohexyl-2-benzothiazolyl Sulfenamide

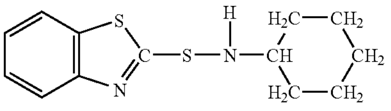

Vulcanization Accelerator 8:
Tetramethylthiuram Disulfide

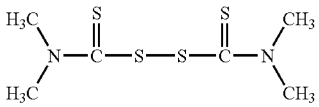

In Comparative Examples 1 and 4, any sulfur-atom-containing compound with specific structure of the present invention was not compounded, and the scorch time in the Mooney scorch test was so short that scorch came about in the extrusion carried out at 90° C.

In Comparative Example 2, since the extrusion temperature was set to as low as 70° C., no scorch was seen, but the effect of vent at the time of extrusion was so small as to cause faulty images due to voids.

In Comparative Example 3, the scorch time in the Mooney scorch test was long, no scorch was seen even in the extrusion carried out at 90° C. and also no faulty images due to voids occurred. However, since the sulfur-atom-containing compound with specific structure according to the present invention was not compounded and the degree of vulcanization was small, faulty images occurred because of the permanent set due to long-term severe-environment leaving.

As can be seen from Table 1, in respect of the charging rollers according to the present invention, the scorch time of the unvulcanized rubber for the elastic layer was 50 minutes or more, no scorch was seen even in the extrusion carried out at 90° C., no faulty images due to voids occurred, and no faulty images also occurred because of the long-term severe-environment leaving.

Example 1-5

Charging Roller 9:

Using the same unvulcanized rubber composition as that in Example 1-1 and the same primer-treated mandrels as those in Example 1-1, these were co-extruded by means of a vented extruder fitted with a crosshead (a vented extruder of 40 mm in diameter; L/D: 20; manufactured by Mitsuba Seisakusho K.K.) to form unvulcanized rubber on the periphery of each mandrel. Here, the feed rate of each mandrel fed from a mandrel feeder was so changed as to be high at mandrel end portions and low at the middle portion, to obtain unvulcanized rubber rollers each having a crown-shaped elastic layer of 12.00 mm in end-portion diameter and 12.10 mm in middle-portion diameter.

The temperature control of the extruder in this Example was so made that the cylinder was set to 80° C., the screw 80° C., and the crosshead 95° C. The number of revolutions of the screw was 8 rpm. Extrusion was carried out for 2 hours. From the beginning of the extrusion, the surface roughness of extruded products was visually observed, where a case in which no change in roughness was seen was judged that no scorch came about. In this Example, no scorch of rubber was seen even in a lapse of 2 hours after the start of extrusion.

The unvulcanized rubber rollers were vulcanized at a temperature of 180° C. for 30 minutes using the same continuous vulcanization equipment as that in Example 1-1. Rubber both ends of the rollers having been thus vulcanized were cut off to make their rubber portions each have a length of 231 mm. The rollers obtained had good surface properties. The electrical resistance of the rubber rollers was measured in the same manner as in Example 1-1.

On each periphery of the rubber rollers obtained, a surface layer was further formed in the same manner as in Example 1-1 to produce charging rollers 9. Using one of these charging rollers 9 in the same electrophotographic apparatus as that in Example 1-1, images were reproduced to make evaluation in the same manner as in Example 1-1.

Comparative Example 5

Charging Roller 10:

Using the same unvulcanized rubber composition as that in Comparative Example 1, this was extruded in the same manner as in Example 1-5. As the result, a change was visually seen in surface roughness of the extruded products in a lapse of 70 minutes after the start of extrusion, where the surface roughness became greatly large and the scorch of rubber was seen.

Comparative Example 6

Charging Roller 11:

An unvulcanized rubber composition with the same formulation as that in Comparative Example 1 was extruded in the same manner as in Example 1-5 except that the temperature control of the extruder was so made that all the cylinder, screw and crosshead were set to 60° C. As the result, no scorch was seen even in a lapse of 2 hours after the start of extrusion.

Vulcanization and rubber end cut-off were carried out in the same manner as in Example 1-5 to obtain rubber rollers. The rubber rollers obtained each had a surface rougher than those in Example 1-5. The electrical resistance of the rubber rollers was measured, and also surfaces layers were formed in the same manner as in Example 1-1 to obtain charging rollers 11. Using one of these charging rollers 9 in the same electrophotographic apparatus as that in Example 1-1, images were reproduced to make evaluation in the same manner as in Example 1-1. As the result, in the image evaluation, faulty images with density non-uniformity corresponding to charging roller's surface non-uniformity in the form of waves with fine pitches were seen to have appeared because of local faulty charging due to a large surface roughness of the elastic layer. This was considered to be caused by the low unvulcanized-rubber extrusion temperature, which made the extruded unvulcanized rubber have poor surface properties to come to have the large surface roughness. That is, charging rollers having surface roughness good enough to make polishing unnecessary were not obtainable at the extrusion temperature at which no scorch came about.

The results of the foregoing are shown together in Table 2.

Example 2

Example in which the elastic member according to the present invention is applied to a developing roller:

Developing Roller 1:

120 parts of an ethylene-propylene-diene terpolymer (trade name: EPT9070E; available from Mitsui Chemicals Inc.) as a material rubber, 1 part of stearic acid as a processing aid, 5 parts of zinc oxide as a vulcanization accelerator activator, 20 parts of calcium carbonate (trade name: SILVER W; available from Shiraishi Kogyo Kaisha, Ltd.) as a filler, 40 parts of SRF carbon black (trade name: ASAHI #35; available from Asahi Carbon Co., Ltd.), 7 parts of Ketjen carbon black (trade name: KETJEN BLACK EC600JD; available from Ketjen Black International Co.) as a conductive agent and 50 parts of paraffin oil (trade name: PW-380; available from Idemitsu Kosan Co., Ltd.) were mixed by means of a pressure kneader to obtain an A-stage kneaded rubber composition.

In 243 parts of this A-stage kneaded rubber composition, 0.5 part of sulfur as a vulcanizing agent, and 1 part of dibenzothiazyl disulfide (trade name: NOCCELER DM; available from Ouchi-Shinko Chemical Industrial Co., Ltd.) and 0.5 part of tetrabenzylthiuram disulfide (trade name: PERKACIT-TBzTD; available from Flexsys Co.) as vulcanization accelerators were mixed by means of an open roll to obtain an unvulcanized rubber composition.

On the unvulcanized rubber composition thus obtained, a Mooney scorch test was conducted in the same manner as in Example 1-1. As the result, even in measurement for 120 minutes, the rise in Mooney viscosity was less than 5 mooneys, and no t5 was observed in the measurement time.

Next, cylindrical conductive mandrels of 8 mm in diameter and 265 mm in length each (made of steel, and surface-coated with nickel) were coated with a metal-to-rubber heat-curable adhesive (trade name: METALOC U-20; available from Toyo Chemical Laboratory Inc.) on the cylinder surfaces at their 235 mm middle portions in the axial direction, followed by drying at 80° C. for 30 minutes and thereafter drying at 120° C. for 1 hour.

These mandrels and the above unvulcanized rubber composition were co-extruded by means of a vented extruder in the same manner as in Example 1-1 to form an unvulcanized rubber layer of 18 mm in outer diameter on the periphery of each mandrel.

The temperature control of the extruder in this Example was so made that all the cylinder, screw and crosshead were set to 90° C. The number of revolutions of the screw was 24 rpm. In the step of extrusion, no scorch of rubber was seen even in a lapse of 2 hours after the start of extrusion.

The unvulcanized rubber composition was vulcanized under the same conditions as in Example 1-1 to obtain rubber rollers each having a semiconductive elastic layer. Rubber both ends of the rollers having been thus vulcanized were cut off to make their rubber portions each have a length of 235 mm. Thereafter, the rubber portions were polished with a rotary hone to obtain rubber rollers each having a straight-shaped semiconductive elastic layer of 16.00 mm in diameter.

Using the same instrument as that in Example 1-1, having the construction shown in FIG. 6, the value of electrical resistance of the rubber rollers (elastic layers) was found in a normal-temperature and normal-humidity (N/N: 23° C./50% RH) environment under application of a DC voltage of 50 V across the mandrel and the aluminum drum. As the result of measurement, the electrical resistance value was found to be $1.1\times10^6$ Ω.

Next, a urethane coating material (trade name: NIPPOLAN N5033; available from Nippon Polyurethane Industry Co., Ltd.) was so diluted with methyl ethyl ketone as to be in a solid-content concentration of 10%. To this coating material, carbon black (trade name: #7360SB; available from Tokai Carbon Co., Ltd.) as a conductive agent and urethane particles of 14 μm in average particle diameter (trade name: ART PEARL C400; available from Negami Kogyo K.K.) as a surface-roughing material were added in amounts of 50 parts and 6 parts, respectively, based on the solid content of the coating material, followed by thorough dispersion. To the dispersion obtained, a curing agent (trade name: COLONATE L; available from Nippon Polyurethane Industry Co., Ltd.) was added in an amount of 10 parts based on the urethane coating material, followed by stirring to prepare a surface-layer-forming coating material. In this coating material, the rubber rollers formed previously were dipped to coat with it the elastic layers of the rubber rollers, followed by drying for 15 minutes in a 80° C. oven, further followed by curing for 4 hours in a 140° C. oven to obtain developing rollers 1 each having on the elastic layer a surface layer of 20 μm in layer thickness.

The surfaces of the developing rollers thus obtained were visually observed to check defects. As the result, no defective portion was seen on the developing roller surfaces.

One of the developing rollers 1 was set in the process cartridge shown in FIG. 5, and images were reproduced using the electrophotographic apparatus constructed as shown in FIG. 2 (trade name: LASER SHOT LBP-2510, manufactured by CANON INC.) to make evaluation. As the result, homogeneous and good images were obtained.

Comparative Example 7

Developing Roller 2:

Materials shown in Table 2 were mixed by means of an open roll to obtain an unvulcanized rubber composition. On the unvulcanized rubber composition thus obtained, the Mooney scorch test was conducted in the same manner as in Example 1. As the result, the scorch time was 40 minutes.

The unvulcanized rubber composition was extruded under the same conditions as those in Example 2. As the result, a change was visually seen in surface roughness of the extruded products in a lapse of 100 minutes after the start of extrusion, where the surface roughness became greatly large and the scorch of rubber was seen.

Comparative Example 8

Developing Roller 3:

Rubber rollers were obtained by extrusion, vulcanization and polishing which were carried out in the same manner as in Comparative Example 5 except that the temperature control of the extruder was so made that all the cylinder, screw and crosshead were set to 70° C.

The electrical resistance value of the elastic layer was measured in the same manner as in Example 2 to find that it was $9.8\times10^5$ Ω. In the step of extrusion, no scorch was also seen even in a lapse of 2 hours after the start of extrusion.

The surfaces of the rubber rollers were coated with a surface layer coating material in the same manner as in Example 2 to obtain developing rollers 3. On the developing rollers 3 thus obtained, their surfaces were visually observed and images were reproduced using one developing roller 3 in the electrophotographic apparatus to make evaluation both in the same manner as in Example 2. As the result, defective portions were seen on the developing roller surfaces. In the image evaluation as well, black spotlike faulty images were seen which were due to faulty development at the defective portions.

The results of the foregoing are shown together in Table 3.

In Comparative Example 7, any sulfur-atom-containing compound with specific structure of the present invention was not compounded, and the scorch time in the Mooney scorch test was so short that scorch came about in the extrusion carried out at 90° C.

In Comparative Example 8, since the extrusion temperature was set to as low as 70° C., no scorch was seen, but the effect of vent at the time of extrusion was so small as to cause faulty images due to voids.

As can be seen from Table 3, in respect of the developing rollers according to the present invention, the scorch time of the unvulcanized rubber for the elastic layer was 50 minutes or more, no scorch was seen even in the extrusion carried out at 90° C., and no faulty images due to voids occurred.

Example 3

Example in which the elastic member according to the present invention is applied to a transfer roller:

Transfer Roller 1:

40 parts of an epichlorohydrin-ethylene oxide-allylglycidyl ether terpolymer (trade name: EPICHLOMER CG102; available from Daiso K.K.) and 60 parts of an acrylonitrile-butadiene copolymer (trade name: NBR-N230S; available from JSR Corporation) as material rubbers, 1 part of stearic acid as a processing aid, 5 parts of zinc oxide as a vulcanization accelerator activator, 50 parts of calcium carbonate (trade name: SILVER W; available from Shiraishi Kogyo Kaisha, Ltd.) as a filler, 10 parts of SRF carbon black (trade name: ASAHI #35; available from Asahi Carbon Co., Ltd.), 8 parts of a liquid acrylonitrile-butadiene copolymer (trade name: NBR-N230; available from JSR Corporation) and 1 part of an antioxidant (trade name: NOCRAC; available from Ouchi-Shinko Chemical Industrial Co., Ltd.) were mixed by means of a pressure kneader to obtain an A-stage kneaded rubber composition.

In 175 parts of this A-stage kneaded rubber composition, 2 parts of azodicarbonamide (ADCA; trade name: CELLMIC; available from Sankyo Kasei Co., Ltd.) and 4 parts of 4,4'-oxybisbenzenesulfonyl hydrazide (OBSH; trade name: NEOCELLBORN #1000S; available from Eiwa Chemical Ind. Co., Ltd.) as blowing agents, 0.8 part of sulfur as a vulcanizing agent, and 1 part of dibenzothiazyl disulfide (trade name: NOCCELER DM; available from Ouchi-Shinko Chemical Industrial Co., Ltd.) and 1 part of tetrabenzylthiuram disulfide (trade name: PERKACIT-TBzTD; available from Flexsys Co.) as vulcanization accelerators were mixed by means of an open roll to obtain an unvulcanized rubber composition.

On the unvulcanized rubber composition thus obtained, the Mooney scorch test was conducted in the same manner as in Example 1 except that the test temperature was set at 90° C. As the result, the scorch time was 52 minutes.

This unvulcanized rubber composition was co-extruded into a tube by means of a vented extruder fitted with a straight head (a vented extruder of 50 mm in diameter; L/D: 16; manufactured by EM Giken K.K.) to form unvulcanized rubber of 15 mm in outer diameter.

Figure 7:
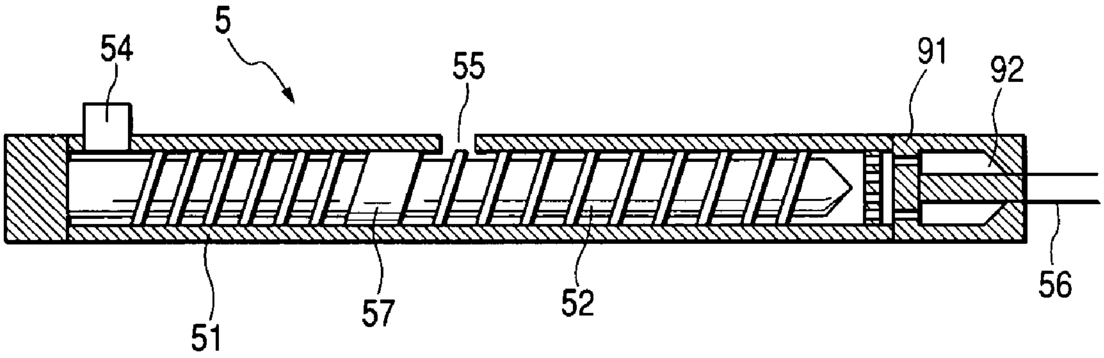
FIG. 7 is a schematic sectional view showing the construction of a vented extrusion equipment fitted with a straight head.

FIG. 7 schematically shows the construction of the vented extruder fitted with a straight head. It is the same extruder as that shown in FIG. 3 except for the head structure. The unvulcanized rubber is extruded into a tube by the aid of a die 56 and a nipple 92 which are provided at the forward end of a straight head 91.

The temperature control of the extruder in this Example was so made that all the cylinder 51, screw 52 and straight head 91 were set to 80° C. The number of revolutions of the screw was 20 rpm. Extrusion was carried out for 2 hours, where no scorch of rubber was seen.

Figure 8:
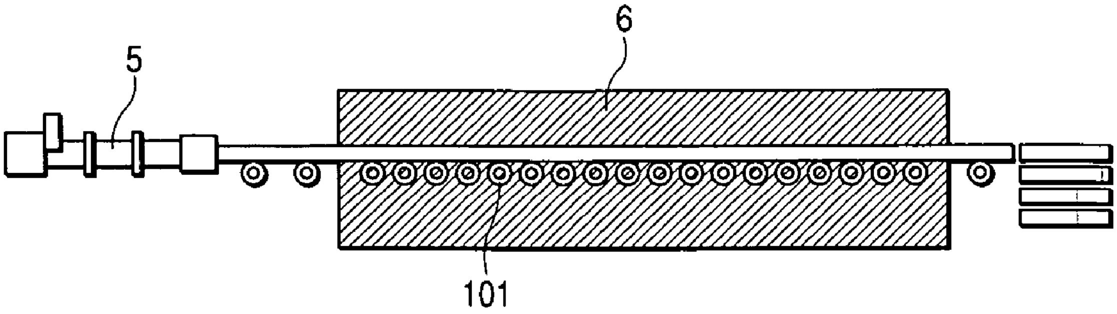
FIG. 8 is a schematic view showing the construction of an equipment for continuously vulcanizing rollers extruded from the straight head extrusion equipment.

FIG. 8 schematically shows the construction of an equipment for continuously vulcanizing an unvulcanized tube extruded from the extruder. Unvulcanized rubber extruded into a tube is continuously transported to a vulcanizing furnace 6 by means of a transport conveyor rollers 101. The vulcanizing furnace 6 is beforehand kept at a preset temperature, where the unvulcanized tube is vulcanized for a preset time depending on the length of the vulcanizing furnace 6 through which it is transported, and comes into a sponge tube.

In this Example, the temperature of the vulcanizing furnace 6 was 180° C., and the vulcanization time (vulcanizing furnace pass time) was 15 minutes. The sponge tube vulcanized and foamed in the vulcanizing furnace were cut in tubes with a stated length by means of a cutter (not shown).

Next, cylindrical conductive mandrels of 6 mm in diameter and 260 mm in length each (made of steel, and surface-coated with nickel) were coated with a metal-to-rubber heat-curable adhesive (trade name: METALOC U-20; available from Toyo Chemical Laboratory Inc.) on the cylinder surfaces at their 220 mm middle portions in the axial direction, followed by drying at 80° C. for 30 minutes and thereafter drying at 120° C. for 1 hour.

To these mandrels, the sponge tubes cut to have a stated length were press-fitted, and were heat-bonded at 160° C. for 1 hour in a hot-air furnace to obtain rubber rollers having elastic layers. Rubber both ends of these rubber rollers were cut off to make their rubber portions each have a length of 220 mm. Thereafter, the rubber portions were polished with a rotary hone to obtain transfer rollers 1 each having a straight-shaped elastic layer of 14.50 mm in diameter.

Using the same instrument as that in Example 1-1, having the construction shown in FIG. 6, the value of electrical resistance of the rubber rollers (elastic layers) was found in a normal-temperature and normal-humidity (N/N: 23° C./50% RH) environment under application of a DC voltage of 100 V across the mandrel and the aluminum drum. As the result of measurement, the electrical resistance value was found to be $2.1\times10^8\ \Omega$.

The surfaces of the transfer rollers thus obtained were visually observed to check defects caused by abnormal blowing. As the result, no defective portion was seen on the transfer roller surfaces.

One of the transfer rollers 1 was set in the electrophotographic apparatus shown in FIG. 2 (trade name: LASER SHOT LBP-1310, manufactured by CANON INC.), and images were formed to make evaluation. As the result, homogeneous and good images were obtained.

Comparative Example 9

Transfer Roller 2:

Materials shown in Table 4 were mixed by means of an open roll to obtain an unvulcanized rubber composition. On the unvulcanized rubber composition thus obtained, the Mooney scorch test was conducted in the same manner as in Example 3. As the result, the scorch time was 42 minutes.

The unvulcanized rubber composition was extruded under the same conditions as those in Example 3. As the result, a change was visually seen in surface roughness of the extruded products in a lapse of 60 minutes after the start of extrusion, where the surface roughness became greatly large and the scorch of rubber was seen.

Comparative Example 10

Transfer Roller 3:

Rubber rollers were obtained by extrusion, vulcanization and polishing which were carried out in the same manner as in Comparative Example 7 except that the temperature control of the extruder was so made that all the cylinder, screw and crosshead were set to 60° C.

The electrical resistance value of the elastic layer was measured in the same manner as in Example 3 to find that resistance value was $1.8\times10^8\ \Omega$. In the step of extrusion, no scorch was also seen even in a lapse of 2 hours after the start of extrusion.

On the transfer rollers 3 thus obtained, their surfaces were visually observed and images were reproduced using one transfer roller 3 in the electrophotographic apparatus to make evaluation both in the same manner as in Example 3. As the result, defective portions due to abnormal blowing were seen on the transfer roller surfaces. In the image evaluation as well, white spotlike faulty images were seen which were due to faulty transfer at the defective portions.

The results of the foregoing are shown together in Table 4.

In Comparative Example 9, any sulfur-atom-containing compound with specific structure of the present invention was not compounded, and the scorch time in the Mooney scorch test was so short that scorch came about in the extrusion carried out at 80° C.

In Comparative Example 10, since the extrusion temperature was set to as low as 60° C., no scorch was seen, but the effect of vent at the time of extrusion was so small as to cause faulty images due to voids.

As can be seen from Table 4, in respect of the transfer rollers according to the present invention, the scorch time of the unvulcanized rubber for the elastic layer was 50 minutes or more, no scorch was seen even in the extrusion carried out at 80° C., and no faulty images due to voids occurred.

TABLE 1

| | Example | | | | Comparative Example | | | |
|---|---|---|---|---|---|---|---|---|
| | 1-1 | 1-2 | 1-3 | 1-4 | 1 | 2 | 3 | 4 |
| Unvulcanized rubber composition | | | | | | | | |
| A-stage kneaded rubber composition: | 152 | 152 | 152 | 152 | 152 | 152 | 152 | 152 |
| Sulfur: | 1 | 1 | 0.3 | 1 | 1 | 1 | 1 | 1 |
| Vulcanization accelerator 1: Dibenzothiazyl disulfide (trade name: NOCCELER DM; available from Ouchi-Shinko Chemical Industrial Co., Ltd.) | 1 | 1 | — | 1 | 1 | 1 | 1 | — |

TABLE 1-continued

| | Example | | | | Comparative Example | | | |
|---|---|---|---|---|---|---|---|---|
| | 1-1 | 1-2 | 1-3 | 1-4 | 1 | 2 | 3 | 4 |
| Vulcanization accelerator 2: Tetrabenzylthiuram disulfide (trade name: PERKACIT-TBzTD; available from Flexis Co.) | 1 | — | 1 | — | — | — | — | — |
| Vulcanization accelerator 3: Tetrakis (2-ethylhexyl) thiuram sulfide (trade name: NOCCELER TOT-N; available from Ouchi-Shinko Chemical Industrial Co., Ltd.) | — | 2 | — | — | — | — | — | — |
| Vulcanization accelerator 4: 1,6-Bis(N,N'-benzylthiocarbamoyldithio)hexane | — | — | — | 1 | — | — | — | — |
| Vulcanization accelerator 5: Zinc dibutyldithiocarbamate (trade name: NOCCELER BZ; available from Ouchi-Shinko Chemical Industrial Co., Ltd.) | — | — | — | — | 1 | 1 | — | — |
| Vulcanization accelerator 6: 6-Methylquinoxaline-2,3-dithiocarbonate (trade name: DAISONET XL21S; available from Daiso K.K.) | — | — | 1 | — | — | — | — | — |
| Vulcanization accelerator 7: N-cyclohexyl-2-benzothiazolyl sulfenamide (trade name: NOCCELER CZ; available from Ouchi-Shinko Chemical Industrial Co., Ltd.) | — | — | — | — | — | — | 2 | — |
| Vulcanization accelerator 8: Tetramethylthiurum disulfide (trade name: NOCCELER TT; available from Ouchi-Shinko Chemical Industrial Co., Ltd.) | — | — | — | — | — | — | — | 1 |
| Hydrotalcite (trade name: HDT-4A; available from Kyowa Chemical Industry Co., Ltd.) | — | — | 3 | — | — | — | — | — |
| Evaluation results | | | | | | | | |
| Scorch time: (min) | 59 | 70 | 50 | 62 | 22 | 22 | >120 | 45 |
| Extrusion temperature: (° C.) | 90 | 90 | 90 | 90 | 90 | 70 | 90 | 90 |
| Scorch, 2 hours after start of extrusion: | no | no | no | no | yes; after 50 min. | no | no | yes; after 100 min. |
| Resistance value of rubber roller (elastic layer): (×$10^5$ Ω) | 7.2 | 6.3 | 6.2 | 6.8 | — | 6.9 | 7.5 | — |
| Initial image quality level: | good | good | good | good | — | poor | good | — |
| Image quality level after severe-environment leaving: | good | good | good | good | — | — | poor | — |

TABLE 2

| | Example | Comparative Example | |
|---|---|---|---|
| | 1-5 | 5 | 6 |
| Unvulcanized rubber composition | | | |
| A-stage kneaded rubber composition: | 152 | 152 | 152 |
| Sulfur: | 1 | 1 | 1 |
| Vulcanization accelerator 1: Dibenzothiazyl disulfide (trade name: NOCCELER DM; available from Ouchi-Shinko Chemical Industrial Co., Ltd.) | 1 | 1 | 1 |
| Vulcanization accelerator 2: Tetrabenzylthiuram disulfide (trade name: PERKACIT-TBzTD; available from Flexis Co.) | 1 | — | — |
| Vulcanization accelerator 5: Zinc dibutyldithiocarbamate (trade name: NOCCELER BZ; available from Ouchi-Shinko Chemical Industrial Co., Ltd.) | — | 1 | 1 |
| Evaluation results | | | |
| Scorch time: (min) | 59 | 22 | 22 |
| Extrusion head temperature: (° C.) | 95 | 95 | 60 |
| Scorch, 2 hours after start of extrusion: | no | yes; after 70 min. | no |

TABLE 2-continued

| | Example | Comparative Example | |
|---|---|---|---|
| | 1-5 | 5 | 6 |
| Resistance value of rubber roller (elastic layer): (Ω) | 7.3 × $10^5$ | — | 7.6 × $10^5$ |
| Initial image quality level: | good | — | poor |

TABLE 3

| | Example | Comparative Example | |
|---|---|---|---|
| | 2 | 7 | 8 |
| Unvulcanized rubber composition | | | |
| A-stage kneaded rubber composition: | 243 | 243 | 243 |
| Sulfur: | 0.5 | 0.5 | 0.5 |
| Vulcanization accelerator 1: Dibenzothiazyl disulfide (trade name: NOCCELER DM; available from Ouchi-Shinko Chemical Industrial Co., Ltd.) | 1 | 1 | 1 |
| Vulcanization accelerator 2: Tetrabenzylthiuram disulfide (trade name: PERKACIT-TBzTD; available from Flexis Co.) | 1 | — | — |

TABLE 3-continued

| | Example | Comparative Example | |
|---|---|---|---|
| | 2 | 7 | 8 |
| Vulcanization accelerator 5: Zinc dibutyldithiocarbamate (trade name: NOCCELER BZ; available from Ouchi-Shinko Chemical Industrial Co., Ltd.) | — | 1 | 1 |
| Evaluation results | | | |
| Scorch time: (min) | >120 | 40 | 40 |
| Extrusion temperature: (° C.) | 90 | 90 | 70 |
| Scorch, 2 hours after start of extrusion: | no | yes; after 100 min. | no |
| Resistance value of rubber roller (elastic layer): (Ω) | $1.1 \times 10^6$ | — | $9.8 \times 10^5$ |
| Initial image quality level: | good | — | poor |

TABLE 4

| | Example | Comparative Example | |
|---|---|---|---|
| | 3 | 9 | 10 |
| Unvulcanized rubber composition | | | |
| A-stage kneaded rubber composition: | 175 | 175 | 175 |
| Azodicarbonamide: (trade name: CELMIKE; available from Sankyo Kasei Co., Ltd.) | 2 | 2 | 2 |
| 4,4'-Oxybisbenzenesulfonyl hydrazide: (trade name: NEOCELBON #1000S; available from Eiwa Chemical Ind. Co., Ltd.) | 4 | 4 | 4 |
| Sulfur: | 0.8 | 0.8 | 0.8 |
| Vulcanization accelerator 1: Dibenzothiazyl disulfide (trade name: NOCCELER DM; available from Ouchi-Shinko Chemical Industrial Co., Ltd.) | 1 | 1 | 1 |
| Vulcanization accelerator 2: Tetrabenzylthiuram disulfide (trade name: PERKACIT-TBzTD available from Flexis Co.) | 1 | — | — |
| Vulcanization accelerator 8: Tetramethylthiuram disulfide (trade name: NOCCELER TT; available from Ouchi-Shinko Chemical Industrial Co., Ltd.) | — | 1 | 1 |
| Evaluation results | | | |
| Scorch time: (min) | 52 | 42 | 42 |
| Extrusion temperature: (° C.) | 80 | 80 | 70 |
| Scorch, 2 hours after start of extrusion: | no | yes; after 60 min. | no |
| Resistance value of rubber roller (elastic layer): (Ω) | $2.1 \times 10^8$ | — | $1.8 \times 10^8$ |
| Initial image quality level: | good | — | poor |

What is claimed is:

1. An elastic member for electrophotography, comprising a mandrel and a conductive or semiconductive elastic layer on the periphery of the mandrel, wherein;

said elastic layer comprises a vulcanized rubber obtained by vulcanizing a non-vulcanized rubber composition comprising a material rubber and at least a sulfur atom-containing compound represented by the following formula (5):

(5)

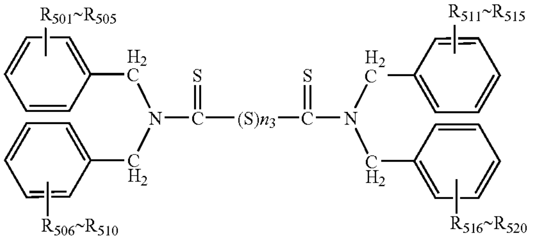

wherein $R_{501}$ to $R_{520}$ each independently represent a hydrogen atom or a monovalent substituent, and $n_3$ is an integer of 1 to 8; and with the proviso that dithiocarbamates are excluded from the non-vulcanized rubber composition;

wherein said non-vulcanized rubber composition comprises said sulfur atom-containing compound in an amount of 20% by weight or more based on the weight of all vulcanization accelerators in said non-vulcanized rubber composition;

wherein said non-vulcanized rubber composition further comprises sulfur as a vulcanizing agent; and wherein said material rubber comprises an ion-conduction type rubber or an insulating rubber compounded with conductive particles.

2. The elastic member according to claim 1, wherein said material rubber is an epichlorohydrin rubber or acrylonitrile-butadiene copolymer, and said non-vulcanized rubber composition has a scorch time of 50 minutes or more.

3. The elastic member according to claim 1, being a roller shaped member.

4. The elastic member according to claim 1, being a charging member for charging an electrophotographic photosensitive member.

5. A process cartridge comprising an electrophotographic photosensitive member and the elastic member according to any one of claims 1-4 which are integrally supported, and being detachably mountable to the main body of an electrophotographic apparatus.

6. The process cartridge according to claim 5, wherein said elastic member is a charging member for charging the etectrophotographic photosensitive member.

7. An electrophotographic apparatus comprising an electrophotographic photosensitive member and the elastic member according to any one of claims 1 to 4.

8. The electrophotographic apparatus according to claim 1, wherein said elastic member is a charging member for charging the electrophotographic photosensitive member.

9. A process for manufacturing the elastic member of claim 1 comprising the steps of:

(a) applying a non-vulcanized rubber composition comprising a material rubber and a sulfur atom-containing compound on the periphery of the mandrel; and (b) vulcanizing said rubber composition on the periphery of the mandrel; wherein said sulfur-atom containing compound is represented by the following formula (5):

(6)

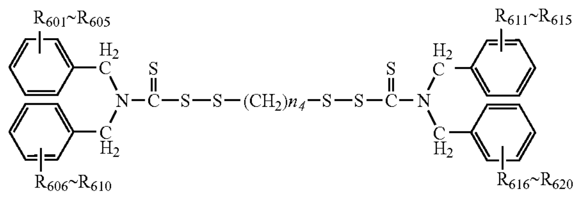

wherein $R_{501}$ to $R_{520}$ each independently represent a hydrogen atom or a monovalent substituent, and $n_3$ is an integer of 1 to 8; and with the proviso that dithiocarbamates are excluded from the non-vulcanized rubber composition;

wherein said non-vulcanized rubber composition comprises said sulfur atom-containing compound in an amount of 20% by weight or more based on the weight of all vulcanization accelerators in said non-vulcanized rubber composition;

wherein said non-vulcanized rubber composition further comprises sulfur as a vulcanizing agent; and wherein said material rubber comprises an ion-conduction type rubber or an insulating rubber compounded with conductive particles.

10. The process according to claim 9, wherein said material rubber is an epichlorohydrin rubber or acrylonitrile-butadiene copolymer, and said non-vulcanized rubber composition has a scorch time of 50 minutes or more.

11. The process according to claim 10, wherein the vulcanizing step is conducted in coexistence with 6-methylquinoxaline-2,3-dithiocarbonate.

12. The process according to claim 9, wherein said step (a) comprises the steps of: (i) extruding said non-vulcanized rubber composition with a vented extruder, and (ii) coextruding said non-vulcanized rubber composition extruded in said step (i) and a mandrel.

13. A process for mass producing the elastic member of claim 1, comprising the steps of:

(i) extruding a non-vulcanized rubber composition containing a material rubber, sulfur and a sulfur atom-containing compound;

(ii) coextruding said non-vulcanized rubber composition extruded in said step (i) and a series of continuously-fed mandrels to form non-vulcanized rubber composition-coated mandrels continuously; and (iii) conveying said non-vulcanized rubber composition-coated mandrels through a vulcanizing furnace to vulcanize said mandrels continuously;

wherein said sulfur-atom containing compound is represented by the following formula (5):

(5)

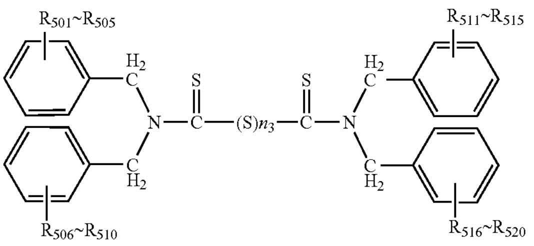

wherein $R_{501}$ to $R_{520}$ each independently represent a hydrogen atom or a monovalent substituent, and $n_3$ is an integer of 1 to 8; and with the proviso that dithiocarbamates are excluded from the non-vulcanized rubber composition;

wherein said non-vulcanized rubber composition comprises said sulfur atom-containing compound in an amount of 20% by weight or more based on the weight of all vulcanization accelerators in said non-vulcanized rubber composition;

wherein said sulfur as a vulcanizing agent; and wherein said material rubber comprises an ion-conduction type rubber or an insulating rubber compounded with conductive particles.

14. The process according to claim 13, wherein said step (i) comprises extruding said non-vulcanized rubber composition with a vented extruder.

15. The process according to claim 13, wherein said vented extruder is connected to a cross-head to which said series of mandrels are continuously fed.

16. A process for manufacturing the elastic member of claim 1 comprising the steps of:

(i) extruding a non-vulcanized rubber composition comprising a material rubber and sulfur atom-containing compound in a tubular shape;

(ii) vulcanizing the non-vulcanized rubber composition in the tubular shape; and (iii) inserting a mandrel into the tubular-shaped rubber composition of step (ii);

wherein said sulfur-atom containing compound is represented by the following formula (5):

(5)

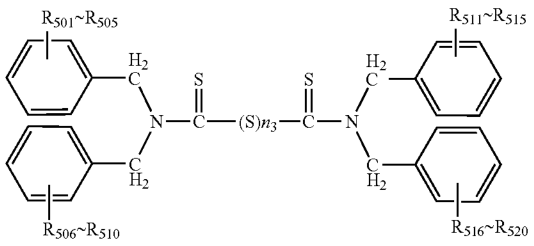

wherein $R_{501}$ to $R_{520}$ each independently represent a hydrogen atom or a monovalent substituent, and $n_3$ is an integer of 1 to 8; and with the proviso that dithiocarbamates are excluded from the non-vulcanized rubber composition;

wherein said non-vulcanized rubber composition comprises said sulfur atom-containing compound in an amount of 20% by weight or more based on the weight of all vulcanization accelerators in said non-vulcanized rubber composition;

wherein said non-vulcanized rubber composition further comprises sulfur as a vulcanizing agent; and wherein said material rubber comprises an ion-conduction type rubber or an insulating rubber compounded with conductive particles.

17. The process according to claim 16, wherein said step (i) said comprises extruding said non-vulcanized rubber composition with a vented extruder.

18. The process according to claim 16, wherein said rubber material is an epichlorohydrin rubber.

19. The process according to claim 18, wherein said rubber composition further comprises 6-methylquinoxaline-2,3-dithiocarbonate.

20. A process for mass producing the elastic members of claim 1 comprising the steps of:

(i) extruding a non-vulcanized rubber composition containing a material rubber, sulfur and a sulfur atom-containing compound in a tubular shape;

(ii) conveying said rubber composition in a tubular shape through a vulcanizing furnace to vulcanize said rubber composition into a continuous rubber tube;

(iii) sectioning said continuous rubber tube into a plurality of rubber tubes; and (iv) inserting mandrels in said rubber tubes;

wherein said sulfur-atom containing compound is represented by the following formula (5):

(5)

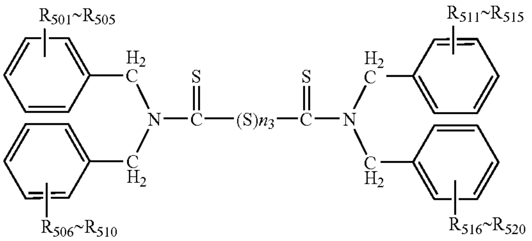

wherein $R_{501}$ to $R_{520}$ each independently represent a hydrogen atom or a monovalent substituent, and $n_3$ is an integer of 1 to 8; and with the proviso that dithiocarbamates are excluded from the non-vulcanized rubber composition;

wherein said non-vulcanized rubber composition comprises said sulfur atom-containing compound in an amount of 20% by weight or more based on the weight of all vulcanization accelerators in said non-vulcanized rubber composition;

wherein said sulfur is a vulcanizing agent; and wherein said material rubber comprises an ion-conduction type rubber or an insulating rubber compounded with conductive particles.

21. The process according to claim 19, wherein said step (i) comprises extruding said non-vulcanized rubber composition with a vented extruder.

22. An elastic member for electrophotography, comprising a mandrel and a conductive or semiconductive elastic layer on the periphery of the mandrel, wherein;

said elastic layer comprises a vulcanized rubber obtained by vulcanizing a non-vulcanized rubber composition comprising a material rubber and at least a sulfur atom-containing compound represented by the following formula (5):

(5)

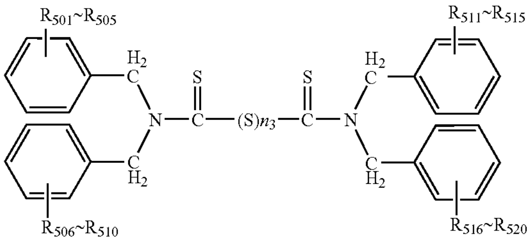

wherein $R_{501}$ to $R_{520}$ each independently represent a hydrogen atom or a monovalent substituent, and $n_3$ is an integer of 1 to 8; and with the proviso that dithiocarbamates and sulfenamides are excluded from the non-vulcanized rubber composition;

wherein said non-vulcanized rubber composition further comprises sulfur as a vulcanizing agent; and wherein said material rubber comprises an ion-conduction type rubber or an insulating rubber compounded with conductive particles.

23. The elastic member according to claim 22, wherein said non-vulcanized rubber composition comprises said sulfur atom-containing compound in an amount of 20% by weight or more based on the weight of all vulcanization accelerators in said non-vulcanized rubber composition.

* * * * *